(12) United States Patent
Reid

(10) Patent No.: US 9,264,599 B2
(45) Date of Patent: Feb. 16, 2016

(54) HAND-HELD DEVICE FOR MOUNTING AND WIRELESSLY TRIGGERING A CAMERA

(71) Applicant: POV Camera Mounts, Inc., Encinitas, CA (US)

(72) Inventor: Tyler Reid, Encinitas, CA (US)

(73) Assignee: POV Camera Mounts, Inc., Encinitas, CA (US)

( * ) Notice: Subject to any disclaimer, the term of this patent is extended or adjusted under 35 U.S.C. 154(b) by 0 days.

(21) Appl. No.: 14/322,900

(22) Filed: Jul. 2, 2014

(65) Prior Publication Data

US 2015/0042830 A1 Feb. 12, 2015

Related U.S. Application Data

(60) Provisional application No. 61/957,442, filed on Jul. 2, 2013, provisional application No. 61/895,939, filed on Oct. 25, 2013, provisional application No. 61/991,402, filed on May 9, 2014.

(51) Int. Cl.
| | |
|---|---|
| *H04N 5/225* | (2006.01) |
| *H04N 5/232* | (2006.01) |
| *F16B 21/04* | (2006.01) |
| *G03B 17/56* | (2006.01) |
| *F16M 11/00* | (2006.01) |
| *F16M 13/08* | (2006.01) |
| *G03B 17/38* | (2006.01) |

(52) U.S. Cl.
CPC ............ *H04N 5/23203* (2013.01); *F16B 21/04* (2013.01); *F16M 11/00* (2013.01); *F16M 13/08* (2013.01); *G03B 17/38* (2013.01); *G03B 17/563* (2013.01); *G03B 17/566* (2013.01); *H04N 5/2251* (2013.01); *Y10T 403/7007* (2015.01)

(58) Field of Classification Search
CPC ............. H04N 5/23203; H04N 5/2257; G03B 17/563; G03B 17/561; G03B 17/566
USPC .......... 348/373, 375–376; 396/419–420, 423, 396/425
See application file for complete search history.

(56) References Cited

U.S. PATENT DOCUMENTS

| | | | | |
|---|---|---|---|---|
| 4,530,580 A | * | 7/1985 | Ueda et al. ..................... | 396/425 |
| 4,727,390 A | | 2/1988 | Brown | |
| 4,984,090 A | * | 1/1991 | Sasaki et al. .................. | 348/376 |

(Continued)

FOREIGN PATENT DOCUMENTS

| | | |
|---|---|---|
| CN | 202498679 | 10/2012 |
| JP | 1991132632 | 5/2007 |

OTHER PUBLICATIONS

Ebay.com, The Original Cam Caddie Scorpion Skate w Board Filing Tool USA Stabilizer Handle, CamCaddie.com, Nov. 22, 2013, 5 pages, [online][retrieved on Oct. 22, 2014] Retrieved from the internet <URL:http://www.ebay.com/itm/Original-Cam-Caddie-Scorpion-Skate-w-Board-Filing-Tool-USA>.

(Continued)

*Primary Examiner* — Kelly L Jerabek
(74) *Attorney, Agent, or Firm* — Fenwick & West LLP

(57) ABSTRACT

Mounting and triggering mechanisms for first person actuation of a camera by an internally mounted remote camera actuator in the form of a handle grip are disclosed for use in any applicable activity, without limitation, such as sporting, recreational, documentary filmmaking and/or photography, or the like.

15 Claims, 54 Drawing Sheets

(56) References Cited

U.S. PATENT DOCUMENTS

| | | | |
|---|---|---|---|
| 5,065,249 A * | 11/1991 | Horn et al. | 348/376 |
| 6,076,978 A | 6/2000 | McIlvenna | |
| 6,384,863 B1 * | 5/2002 | Bronson | 348/373 |
| 6,663,298 B2 | 12/2003 | Haney | |
| 6,773,110 B1 | 8/2004 | Gale | |
| 6,862,407 B2 | 3/2005 | Gale | |
| 7,048,453 B1 * | 5/2006 | Gaunt | 396/420 |
| 7,684,694 B2 | 3/2010 | Fromm | |
| 7,706,673 B1 * | 4/2010 | Staudinger et al. | 396/58 |
| 8,002,480 B2 | 8/2011 | Polster | |
| 8,373,762 B2 * | 2/2013 | Cottagnoud | 348/211.7 |
| 8,757,901 B2 * | 6/2014 | Fromm | 396/428 |
| 2004/0223753 A1 * | 11/2004 | Gale | 396/421 |
| 2006/0268156 A1 * | 11/2006 | Gale | 348/373 |
| 2007/0177866 A1 * | 8/2007 | Fujimoto | 396/376 |
| 2008/0187308 A1 | 8/2008 | Hannan | |
| 2009/0003822 A1 | 1/2009 | Tyner | |
| 2009/0190916 A1 * | 7/2009 | Sharp | 396/425 |
| 2010/0200710 A1 | 8/2010 | Shenouda | |
| 2011/0024596 A1 | 2/2011 | Kephart | |
| 2013/0010186 A1 | 1/2013 | Scarola | |
| 2013/0176412 A1 * | 7/2013 | Chen | 348/77 |

OTHER PUBLICATIONS

Zen Cart, "ULCS TR-GP for GoPro Housing," Reef Photo & Video, 2014, 3 pages, [online][retrieved on Oct. 22, 2014] Retrieved from the internet <URL:http://reefphoto.com/shop/index.php?main_page=product_info&products_ids=5508>.

Diffen, Bluetooth vs. Wi-Fi, 2013, 3 pages, [online][retrieved on Oct. 1, 2014] Retrieved from the internet <URL:http//www.diffen.com/difference/Bluetooth_vs_Wifi>.

Comworth, B., "Review: Grip & Shoot iPhone photography pistol grip," Gizmag, Oct. 25, 2013, 1 page, [online][retrieved on Oct. 1, 2014] Retrieved from the internet <URL:http//www.gizmag.com/grip-and-shoot-review/29546>.

PCT International Search Report and Written Opinion for PCT/US2014/045323, Nov. 27, 2014, 8 pages.

* cited by examiner

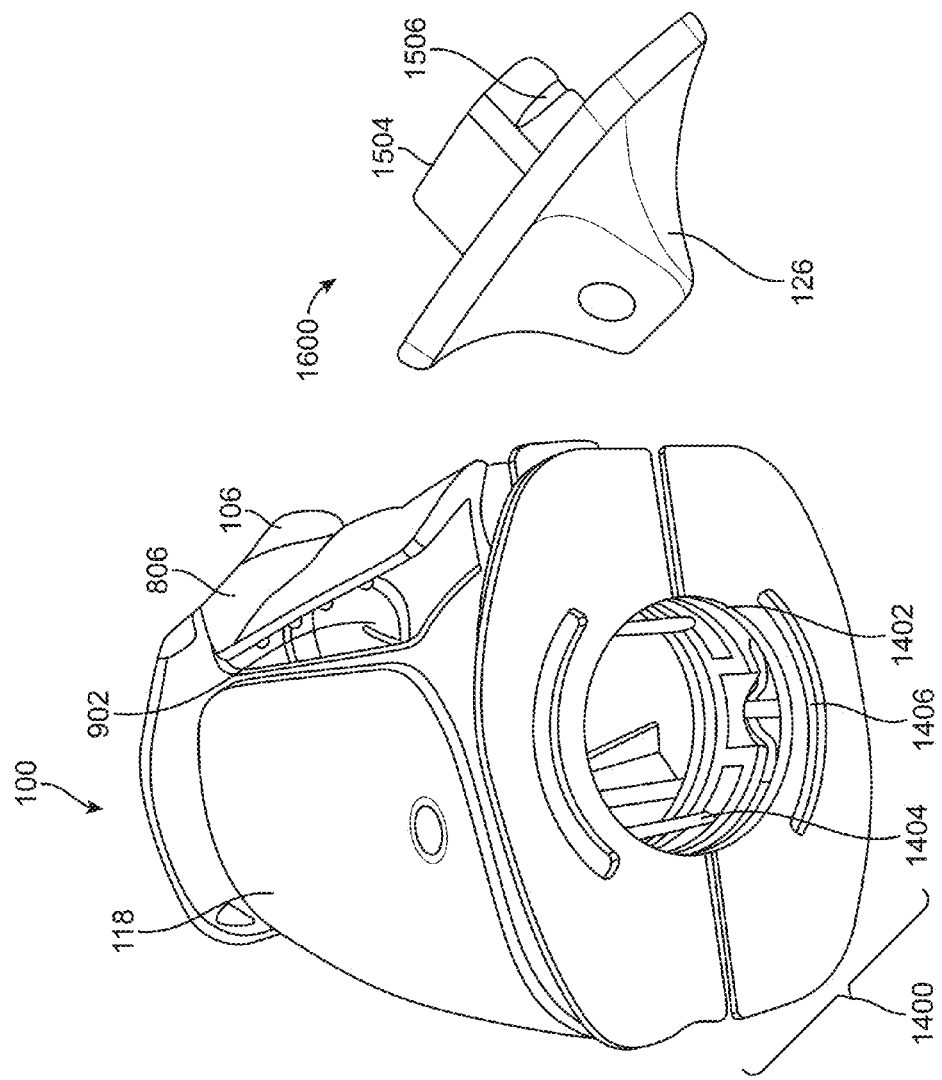

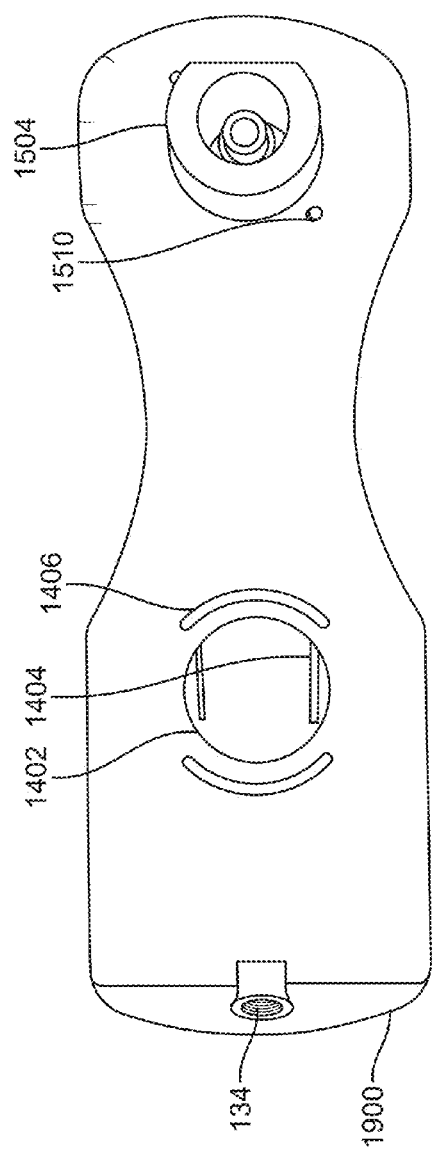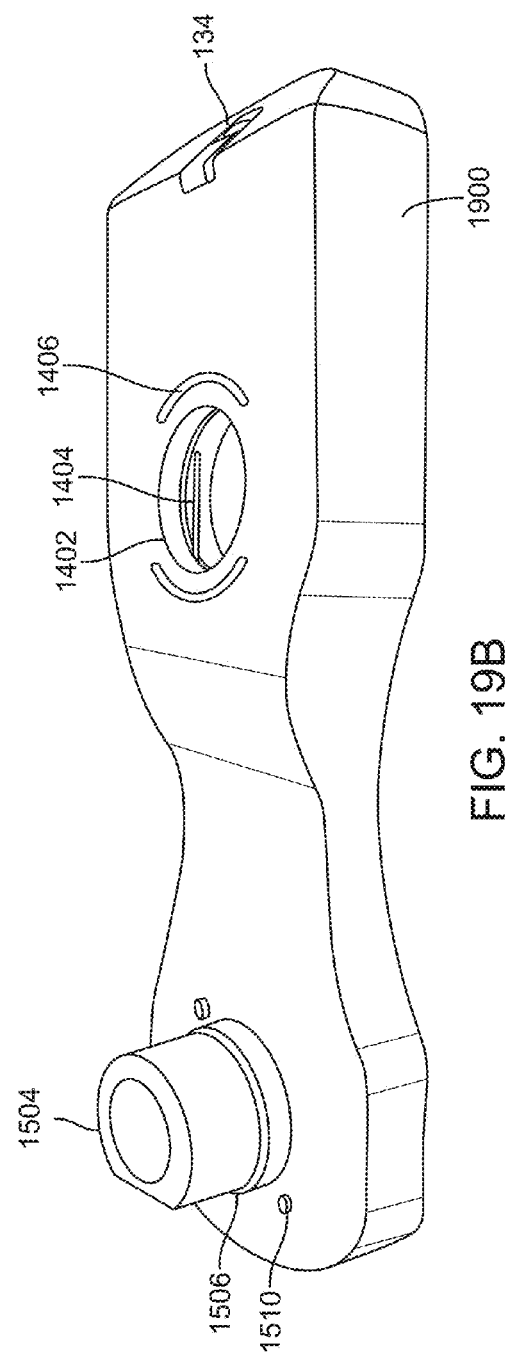
FIG. 19A
FIG. 19B

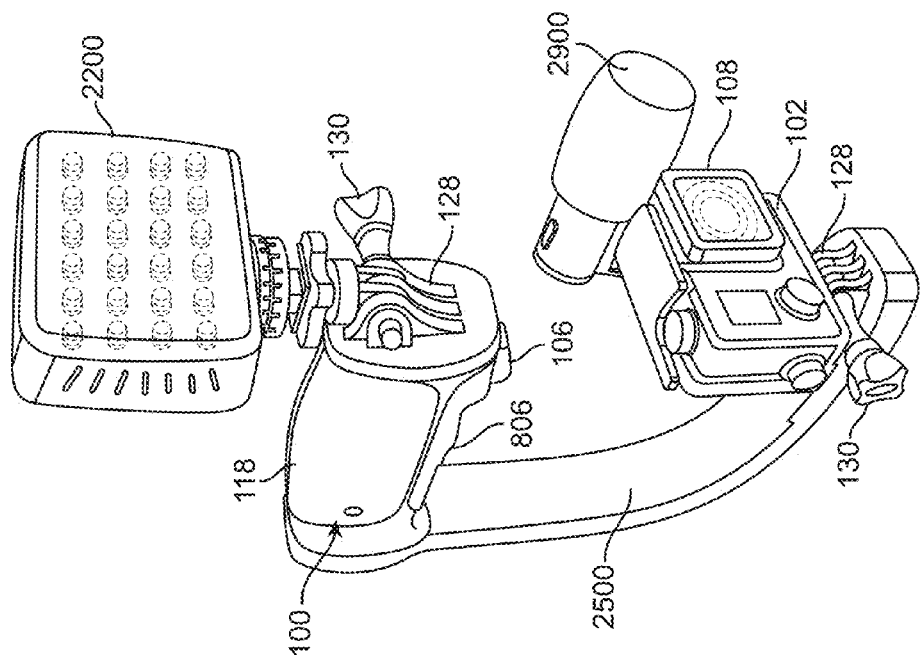
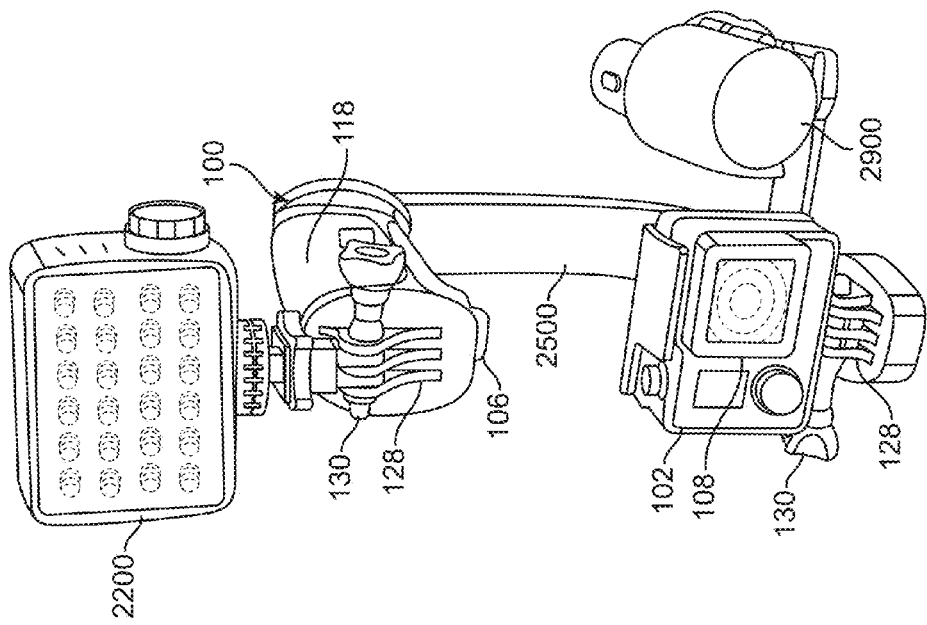
FIG. 29A
FIG. 29B

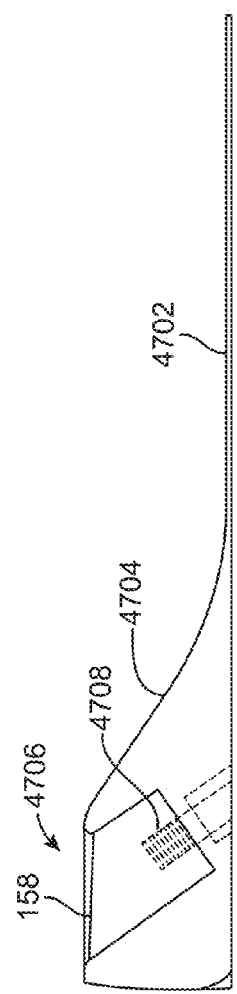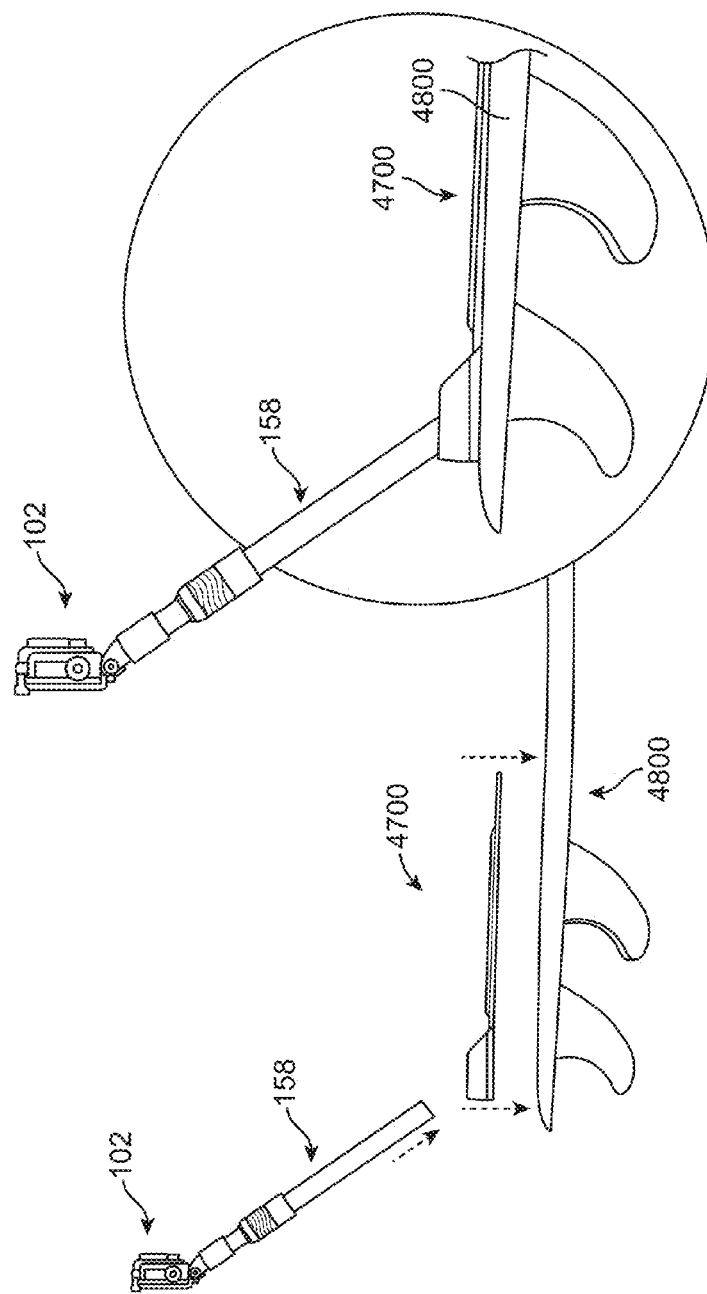

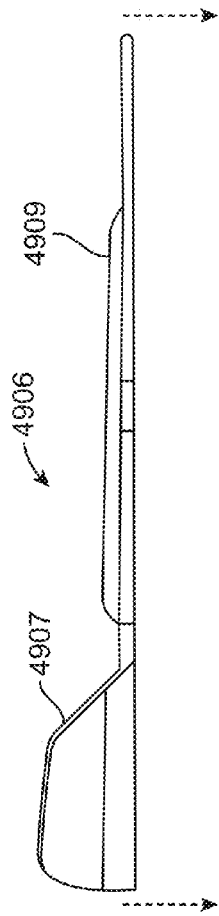
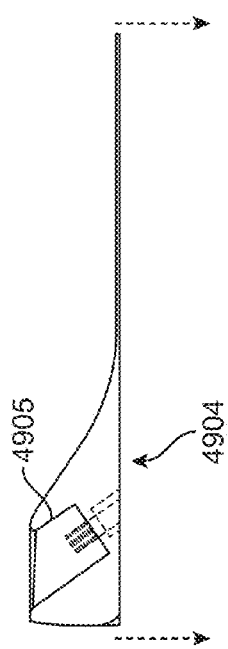
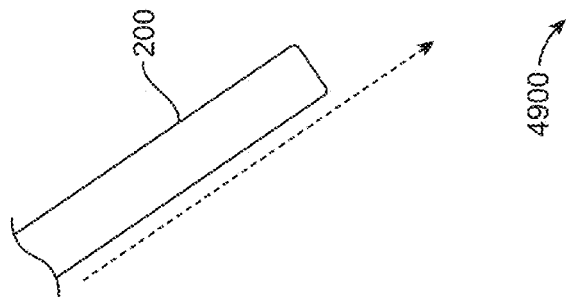
FIG. 49A
FIG. 49B

HAND-HELD DEVICE FOR MOUNTING AND WIRELESSLY TRIGGERING A CAMERA

CROSS-REFERENCE TO RELATED APPLICATIONS

This application claims priority under 35 U.S.C. §119(e) to U.S. provisional application No. 61/957,442, filed Jul. 2, 2013 and entitled "Hand-held device for Mounting and Triggering a Camera Via Attached Remote Camera Actuator," to U.S. provisional application No. 61/895,939, filed Oct. 25, 2013 and entitled "Board Grip Camera Mount," and to U.S. provisional application No. 61/991,402, filed May 9, 2014 and entitled "Hand-Held Device for Mounting and Triggering a Camera Via Attached Remote Camera Actuator." The disclosure of each of these applications is incorporated herein in its entirety.

TECHNICAL FIELD

The subject matter described herein relates to mounting and/or triggering systems, methods, etc. that can enable first person actuation of a camera via a wireless remote control device.

BACKGROUND

Challenges associated with conveniently and comfortably composing desired images within the field of hand-held photography have existed nearly since the advent of the hand-held camera. Often, the shape of the camera and positioning of the shutter actuator button (e.g. a capture button as it is referred to herein) and/or other camera controls are not conveniently located for certain applications. For this reason (among potential others), manufacturers of digital cameras have produced secondary remote control devices that can support functions such as triggering, toggling the camera between image recording modes, etc. via a wireless signal, such as for example a WI-FI® signal, an infrared signal, a Bluetooth signal, etc.). A remote control device generally provides more options for the user to actuate a camera. However, using currently available approaches, a user is generally required to use both hands (e.g. one to hold the camera and one to hold and actuate the remote device), which inherently limits the user's ability to engage in certain activities safely or practically. Another potential challenge with currently available approaches to triggering a camera is the inability to do so while the camera is extended away from the user, for example by a boom or extension attachment for achieving different desired viewing perspectives. This issue can be particularly problematic when attempting to capture precise still images while the camera is attached to such an extension away from the user such that the user is unable to easily press the shutter release button. As modern digital cameras do not generally include a mechanical shutter, the term "capture button" is used throughout to generally refer to a button or control that causes a camera to capture one or more still photographic images and/or to begin or stop recording a video and/or audio stream. In addition, the capture button in many cameras and accompanying camera housings are often difficult to press without resulting in shaky and misframed images when used in fast paced image capturing situations such as sporting activities.

Given these challenges and potentially others within the field of hand-held photography, many participants choose not to attempt capturing such images due to the limited ability to achieve the desired images safely and conveniently in many situations.

SUMMARY

Aspects of the current subject matter can provide systems, methods, articles of manufacture, and the like that enable manipulation of a camera and actuation of a remote control device using a single hand.

In one aspect, an apparatus includes a hand-held device configured to be held in a hand, a first mounting feature for connecting at least one camera component to the hand-held device, and a second mounting feature for integrating a remote control device for wirelessly operating a camera with the hand-held device. The apparatus further includes an actuation control that, when operated by a finger of the hand in which the hand-held device is held, causes a capture button on the remote control device to be actuated to cause the camera to capture one or more photographs or to stop or start capturing video and/or audio footage.

In an interrelated aspect, a method includes connecting at least one camera component to a hand-held device configured to be held in a user's hand using a first mating feature. The hand-held device also includes a second mounting feature that integrates a remote control device for wirelessly operating a camera with the hand-held device. The method further includes holding the hand-held device in the user's hand and operating an actuation control by a finger of the user's hand. The operating causes a capture button on the remote control device to be actuated to cause the camera to capture one or more photographs or to stop or start capturing video and/or audio footage.

In another interrelated aspect, a connector system includes a socket structure on a first apparatus to be joined to a second apparatus. The socket structure includes a retaining piece, which includes opposing inner locking portions that are disposed approximately orthogonally to an axis of the socket structure. The connector system also includes a mating post on the second apparatus. The mating post includes side slots along two opposing sides of the mating post. The side slots on the mating post fixably engage with the inner locking portions of the retaining piece when the mating post is inserted into the socket structure at least approximately in parallel to the axis of the socket structure and the second apparatus is subsequently rotated from an insertion orientation to a locked orientation.

In yet another interrelated aspect, a method of joining a first apparatus to a second apparatus includes inserting a mating post on the second apparatus into a socket structure on the first apparatus in a direction parallel to an axis of the socket structure. The mating post includes side slots along two opposing sides of the mating post, and the socket structure includes a retaining piece, which includes opposing inner locking portions that are disposed approximately orthogonally to the axis of the socket structure. The method also includes rotating the second apparatus relative to the first apparatus from an insertion orientation to a locked orientation subsequent to the inserting. The rotating causes the side slots on the mating post to fixably engage with the inner locking portions of the retaining piece.

In some variations one or more of the following features can optionally be included in any feasible combination. The camera can include a GoPro® camera. The first mounting feature can include a socket structure on the hand-held device (e.g. the first apparatus) and a mating post on the at least one camera component (e.g. the second apparatus). The socket structure can include a retaining piece, which can include opposing inner locking portions that are disposed approximately orthogonally to an axis of the socket structure. The mating post can include side slots along two opposing sides of the mating post. The side slots on the mating post can fixably engage with the inner locking portions of the retaining piece when the mating post is inserted into the socket structure at least approximately in parallel to the axis of the socket structure and the at least one camera component is subsequently rotated from an insertion orientation to a locked orientation. The hand-held device further can include one or more grooves on a first surface into which the socket structure is set. The at least one camera component can include one or more guide pins on a second surface that comes into contact with the first surface when the hand-held device and the at least one camera component are connected. The one or more guide pins can slide within the one or more grooves as the at least one camera component is rotated from the insertion orientation to a locked orientation. The one or more guide pins and the one or more grooves can cooperate to restrain an angle of rotation of the at least one camera component relative to the hand-held device to a locking angle.

The first mounting feature further can include a locking bar configured to restrict rotation of the at least one camera component from the locked orientation to the insertion orientation unless the locking bar is manipulated to disengage a locking feature on the locking bar from a locking receiving feature on the hand-held device. The first mounting feature can allow two opposite orientations of the at least one camera component relative to the hand-held device. The at least one camera component can include the camera. The at least one camera component can alternatively or in addition include at least one of a camera boom, a side grip, a suitcase grip, and a pole device.

The second mounting feature for integrating the remote control device can include a remote control compartment accessible by a hinged door on a side of the hand-held device. The remote control compartment can be sized and shaped to accept the remote control device. The second mounting feature for integrating the remote control device can include a retaining clip disposed at an end of the hand-held device that secures the remote control device with a front. The second mounting feature for integrating the remote control device can include computer circuitry that implements the remote control device functionality as part of the hand-held device. The second mounting feature can include a recess or clip that positions and orients the remote control device such that a user can directly press the capture button on the remote control device.

The actuation control can include a trigger button configured to be pressed by an index finger of the hand in which the hand-held device is configured to be held. The actuation control further can include a mechanical arm that is deflected or moved upon the trigger button being depressed. The mechanical arm can press the capture button on the remote control device.

In still another interrelated aspect, a system includes a grip pad configured to attach to a top surface of a sports board, a pad mount integrated with the grip pad, and one or more mounting mechanisms associated with the mounting cavity. The pad mount includes a mounting cavity sized and adapted to receive a camera boom, and the camera boom is configured to support a camera at an opposite end of the camera boom from a first end received by the mounting cavity. The one or more mounting mechanisms are configured to fixedly mount the camera boom to a top surface of the sports board. A method can include use of such a system to support a camera on a sports board.

In some variations one or more of the following features can optionally be included in any feasible combination. The system further can include a preferred breakaway point. The preferred breakaway point can be structurally weaker than a remainder of the camera boom such that breakage of the boom under effects of an impact, compressive, or expansive force greater than a threshold amount of force occurs at the preferred breakaway point. The system further can include a spacer part that includes the preferred breakaway point. The spacer part can be configured to extend the camera boom at the first end and to be received in the mounting cavity. The system further can include a leash or tie retainer. The leash or tie retainer can be configured to be axially retained between the spacer part and the camera boom such that a loop on the leash or tie retainer is available to receive a first end of a flexible connector having a second end secured to one or more of the sports board, the grip pad, and the user.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 19 through FIG. 24 show various views illustrating features of a side grip device for connecting a hand-held device to a camera and/or other components consistent with implementations of the current subject matter;

FIG. 25A through FIG. 31 show various views illustrating features of a suitcase grip device for connecting a hand-held device to a camera and/or other components consistent with implementations of the current subject matter;

FIGS. 47A-47C show various views of a board grip camera mount consistent with implementations of the current subject matter;

FIG. 48A and FIG. 48B show views illustrating implementations of a board grip camera mount mounted to a board;

FIG. 49A and FIG. 49B show assembled and exploded views, respectively, of an implementation of a board grip camera mount;

When practical, similar reference numbers denote similar structures, features, or elements.

DETAILED DESCRIPTION

Figure 1:
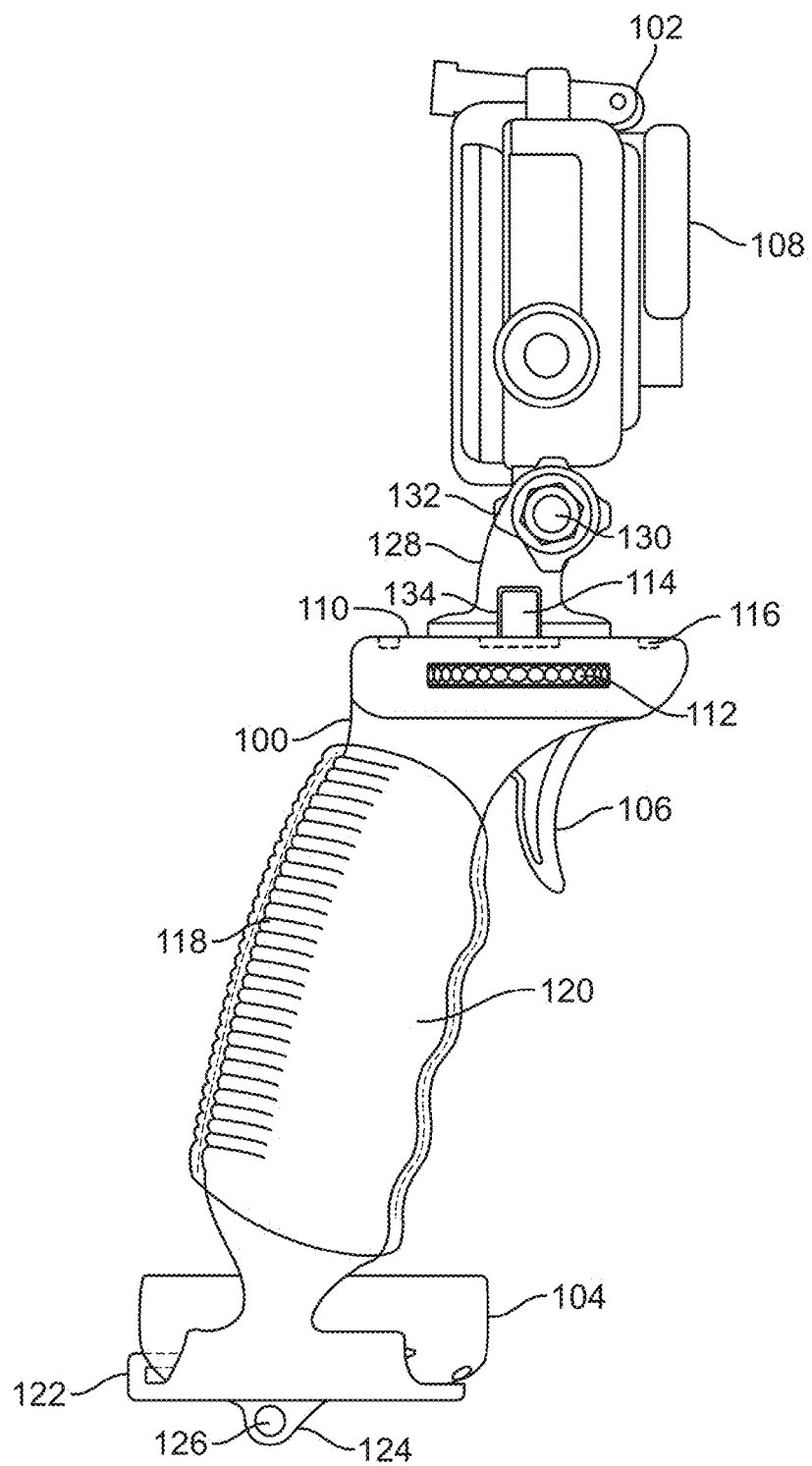
FIG. 1 shows a lateral view of a hand-held device having a secured remote control device and an attached camera consistent with implementations of the current subject matter.

A non-limiting example of a camera that enables users to record still photographic images, video, audio, and the like, in particular in environments where motion, activity, etc. of one or more of the subject and the photographer can make action photography with conventional equipment difficult or even dangerous is the Hero® line and other GoPro® cameras available from GoPro, Inc. of San Mateo, Calif. For ease of description herein, the term camera will be understood to refer to any type of camera that can be feasibly used in conjunction with the descriptions provided or their equivalents. The approaches discussed and described herein are understood to be applicable to any image-capturing device, including those suitable for capturing either or both of still photographs and video. One advantage of many possible using approaches discussed herein is the ability to, with a single hand, both actuate a camera via an remote control device and also secure the camera in a desired position, direction, etc. For many motion-related activities in which users attempt to capture photographs or video, use of more than one hand for steadying and actuating a camera is not desirable.

The current subject matter also includes various mounting configuration options associated with a hand-held device or other arrangements for securing and orienting a camera to provide a user with additional camera positioning options and freedom to capture desired imagery during various activities. Consistent with some implementations of the current subject matter, a hand-held device can be configured for mounting a camera to a part of the hand-held device. The hand-held device can further include or be configured to include integrated wireless remote control functionality. As discussed in further detail below, the integrated functionality can optionally include one or more structures or features that allow a separate remote control device to be secured to or within the hand-held device and activated by a user using a single hand that is also used to hold the hand-held device. In other variations, the integrated functionality can include electronics or other hardware integrated into the hand-held device to provide remote control functions, which can be activated by a user with a single hand that holds the hand-held component to which a camera is mounted. Systems and methods consistent with the disclosed subject matter can be suitable for use during a variety of activities during which a user wishes to record video, audio, and/or photographic documentation, for example team or individual sports, recreational or documentary filmmaking, nature or wilderness video or photography, or the like.

FIG. 1 through FIG. 6 illustrate features of some example configurations consistent with an implementation of the current subject matter. In general, a hand-held device 100 can include one or more securing structures configured to allow connections to one or more of a camera 102, an additional supporting structure, a lighting or sound collection device, another peripheral device that can be advantageously used in association with a camera, and the like. The hand-held device 100 can include or be configured to receive a first mounting feature for mounting a camera 102 (optionally to optionally to an upper end of the hand-held device 100) and a second mounting feature for mounting a remote control device 104 suitable for sending commands wirelessly to the mounted camera. The first mounting feature is configured for mounting or securing a camera. The second mounting feature can be configured for attaching, housing, etc. the remote control device 104, and is discussed in greater detail below. Also discussed in greater detail below is a third mounting feature that can permit attachment of peripheral devices such as lights, microphones or other audio equipment, a retention leash or other strap, other support or positioning devices, etc.

The hand-held device 100 can include an actuation control 106 (e.g. a trigger as shown in FIG. 1 or some other button or control or other options discussed herein or otherwise consistent with the current disclosure). The actuation control can in some implementations be configured to activate one or more mechanical, electrical, etc. features to react to a user pressing the actuation control 106 by actuating a capture button 140 on the remote control device 104 (see FIG. 2) secured to or within the hand-held device 100 by the second mounting feature. The actuation control can be positioned such that a user holding the hand-held device 100 using a grip 118, which can optionally be a textured grip 118, of the hand-held device 100 can conveniently operate the actuation control 106 without changing how the grip 118 is held in the user's hand. The textured grip 118 can optionally be part of an external floating component 120, for example one made of a different material than a body of the hand-held device 100.

In various implementations of the current subject matter, the camera 102 can be positioned facing forwards, backwards, sideways, and/or at any position in-between relative to a natural orientation of the hand-held device 100. In other words, in examples in which a shape of at least the grip 118 of the hand-held device 100 is ergonomically shaped to be held in a user's hand (e.g. optionally resembling a pistol grip), a natural orientation of the hand-held device 100 can refer to one in which a user would comfortably hold the grip 118 in a hand.

The first mounting feature can also optionally include a pivoting joint or other connector feature to allow the user to rotate the camera 102 upwards or downwards (e.g. about one or more axis) relative to an orientation of the hand-held device 100, and to secure the camera 102 at a desired position according to the user's preference to capture still images and/or video from different angles. The first mounting feature can optionally secure the camera 102 at a location that is relatively close to the grip 118 and actuation control 106 on the hand-held device. Alternatively, and as discussed in greater detail below, the first mounting feature can include or attach to a spacer (e.g. a boom, an adjustable extension, pole, or some other structure than can include one or more assembled parts) or other intermediate mounting structure 128 configured to allow the user to secure the camera at some chosen position and angle relative to the grip 118 on the hand-held device 100.

Figure 2:
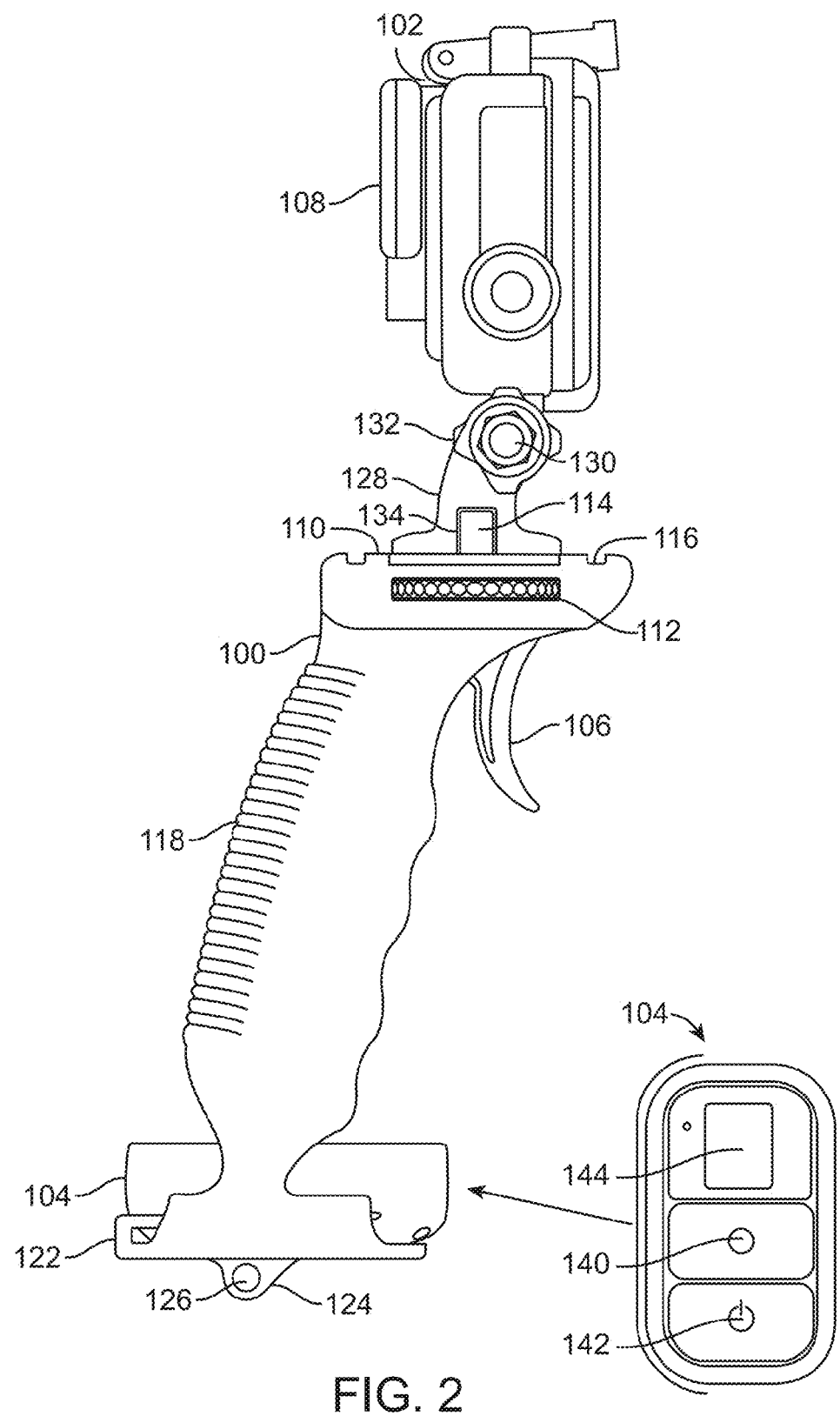
FIG. 2 shows a second lateral view of a hand-held device having a secured remote control device and an attached camera directed in an opposite direction from the assembly shown in FIG. 1 consistent with implementations of the current subject matter.
Figure 3:
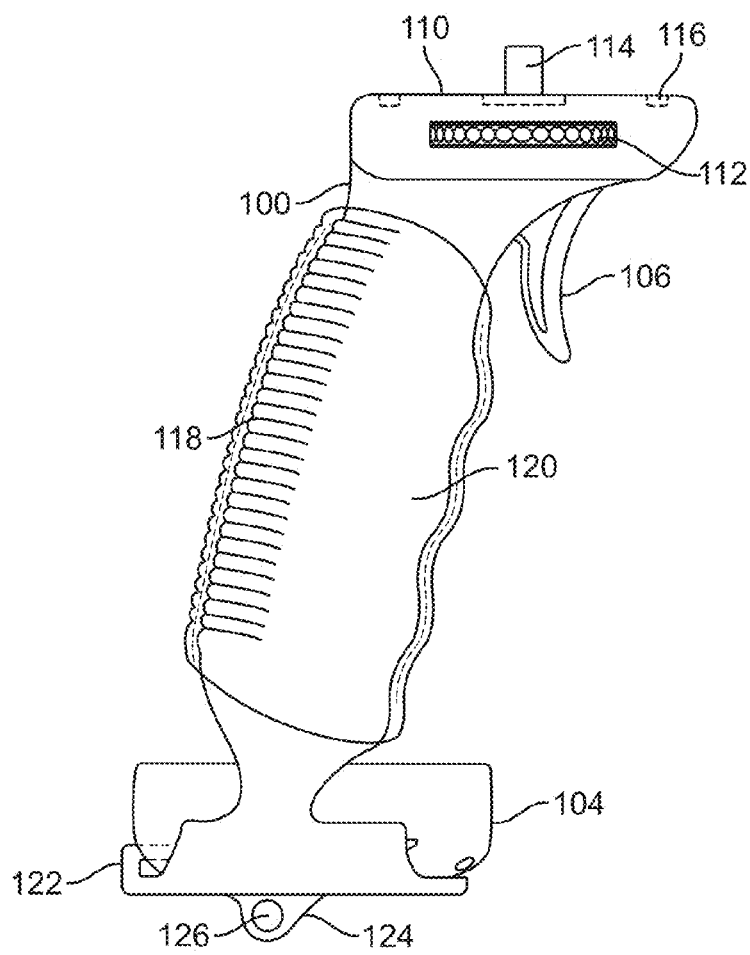
FIG. 3 shows a lateral view of a hand-held device consistent with implementations of the current subject matter with no camera mounted.

One example of a first mounting feature consistent with implementations of the current subject matter can include an intermediate mounting structure 128, such as is shown in FIG. 1, FIG. 2, and FIG. 3. The intermediate mounting structure 128 can in some variations be a tripod mounting device, such as for example a GoPro® tripod mount. An intermediate mounting structure 128 and a mating connector part attached to or otherwise part of the camera 102 can include one or more complementary protrusions and indentations 132 (e.g. a dual protruding tab and pin system), which can interlock such that a series of pass-through holes in the mating connector part and the intermediate mounting structure 128 align to allow a pin 130 to pass through them to secure the mating connector part and the intermediate mounting unit. In the example of a GoPro® tripod mount and/or other possible configurations of an intermediate mounting structure 128, an opposite side of the intermediate mounting unit from the side that includes the features for cooperative connection with the mating connector part on the camera 102 can include a feature for securely connecting to a camera. For example, a female ¼"-20 threaded connector on 134 the intermediate mounting structure 128 can receive and attach to a male ¼"-20 threaded screw connector 114. The threaded screw connector 114 can be rotated using a thumbwheel (e.g. a finger-tightening knob) 112 which is connected to the male ¼"-20 threaded screw such that the intermediate mounting structure 128 is held against a surface 110 of the hand-held device 100.

FIG. 1 illustrates a lateral (e.g. side) view of a hand-held device 100 with a camera 102 attached thereto such that a lens 108 of the camera 102 facing forward relative to a direction in which the hand-held device 100 is directed when a user holds the hand-held device 100 in a hand. The camera 102 in this example is attached to a first mounting feature, which includes the intermediate mounting structure 128 discussed above, which is in turn connected to the hand-held device 100. In the illustrated example, the intermediate mounting structure 128 includes at least some features in common with a GoPro® tripod mount. However, it will be well understood that other variations of an intermediate mounting structure 128 can be included consistent with implementations of the current subject matter. This lateral view in FIG. 1 also shows the connection pin 130 and thumbwheel 112 which secure the camera 102 to the intermediate mounting structure 128 and the intermediate mounting structure 128 to the hand-held device 100.

The lower portion of the hand-held device 100 shown in FIG. 1, FIG. 2, and FIG. 3 also includes a second mounting feature that attaches a remote control device 104 at an end (e.g. a base or lower end) of the hand-held device 100 opposite from the end where the first mounting feature (e.g. the intermediate mounting structure 128) attaches to the hand-held device 100. In this example the second mounting feature includes a retaining clip 122 that secures the remote control device 104 with a front face of the remote control device 104 facing upwards toward the rest of the hand-held device 100. Beneath the retaining clip 122, the hand-held device 100 can include an accessory mounting component 124 and can include a pass-through hole 126 that can permit insertion of a retaining pin (e.g. to secure yet another external mounting surface. The accessory mounting component 124 containing a pass-through hole 126 can all be also be used as a connection point for a leash/tether for securing the hand-held device 100 and the attached camera 102 to the user or to some other secure object.

While the example discussed in relation to FIG. 1 through FIG. 6 includes an external retaining clip 122 for securing the remote control device 104 integral to the hand-held device 100, it will be understood that other second mounting feature options are also within the scope of the current subject matter. For example, the second mounting feature can optionally include a compartment, a recess, or the like formed into the hand-held device 100 to receive a remote control device 104. Alternatively, as noted above, the hand-held device 100 can include one or more electronic components (e.g. computer circuitry) integrated into its structure that implements the remote control device functionality as part of the hand-held device (e.g. by providing one or more features comparable to those of a separate remote control device 104 that is secured to or within a hand-held device 100. In still other implementations of the current subject matter, the second mounting feature can include a clip, a recess, or the like that holds the remote control device 104 in a position and orientation that allow a user holding the hand-held device 100 to directly press the capture button 140 with a finger or thumb of the hand holding the hand-held device 100. For example, the second mounting feature can hold the remote control device 104 in association with the hand-held device 100 such that a user can actuate the capture button with an index finger, with a thumb, or with any other finger of the hand holding the handheld device 100.

FIG. 2, which shows a lateral view of the hand-held device 100 with a secured remote control device 104 and a camera 102 mounted with the lens 108 facing in an opposite (e.g. backward) direction relative to the view in FIG. 1, also shows a front view of a remote control device 104. An example of a remote control device 104 can include a mode viewing screen 144, a capture button 140, and a mode or power button 142. A hand-held device 100 and/or other structures designed to secure other configurations of a remote control device 104 to or within a hand-held device 100 are also within the scope of the current subject matter. FIG. 3 shows a lateral view of the hand-held device 100 without the camera 102 attached thereto.

Figure 4:
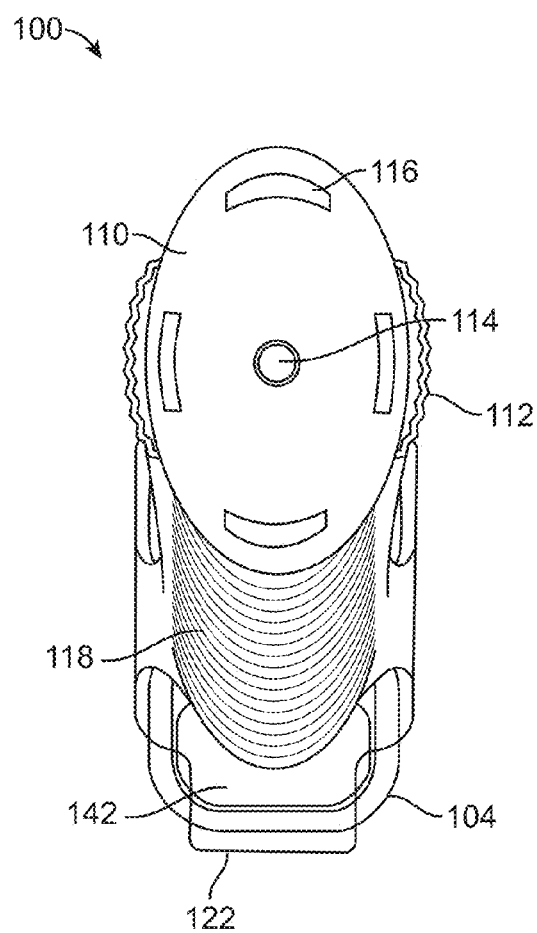
FIG. 4 shows a top view of a hand-held device consistent with implementations of the current subject matter with no camera mounted.

FIG. 4 shows a top view of a hand-held device 100 with a remote control device 104 attached via a retaining clip 122 as also shown in FIG. 1, FIG. 2, and FIG. 3. This top view also shows the thumbwheel 112 which in this example rotates a ¼"-20 threaded screw 114 as well as the a top surface 110 of the hand-held device that can include female tab inserts 116 for securing a clip attachment mount 132 (e.g. a GoPro® compatible clip attachment mount) or an intermediate mounting structure 128.

Figure 5:
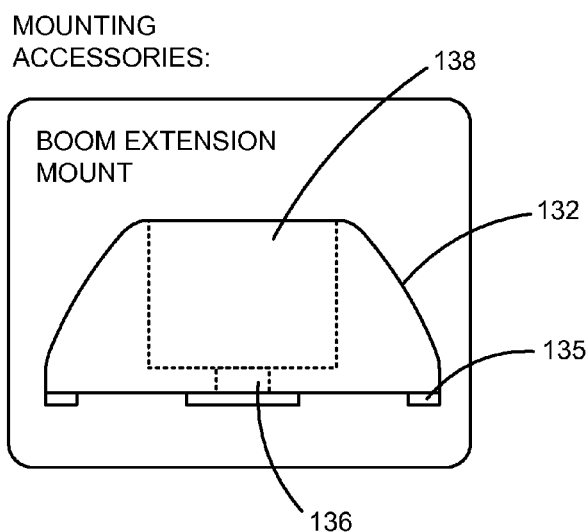
FIG. 5 shows a view of a first mounting feature that includes a clip attachment mount for a boom extension.

FIG. 5 shows another example of a first mounting feature, which in this example includes a clip attachment mount for a boom extension 132. The clip attachment mount 132 shown includes a cavity 138 to incorporate support of a boom as well as a pass-through hole 136 for a male threaded unit 114 to pass through and thereby secure the clip attachment mount 132 to the hand-held device 100. The clip attachment mount 132 can also include male mounting tabs 135 that plug into the corresponding female mounting tabs 116 shown on hand-held device 100.

Figure 6:
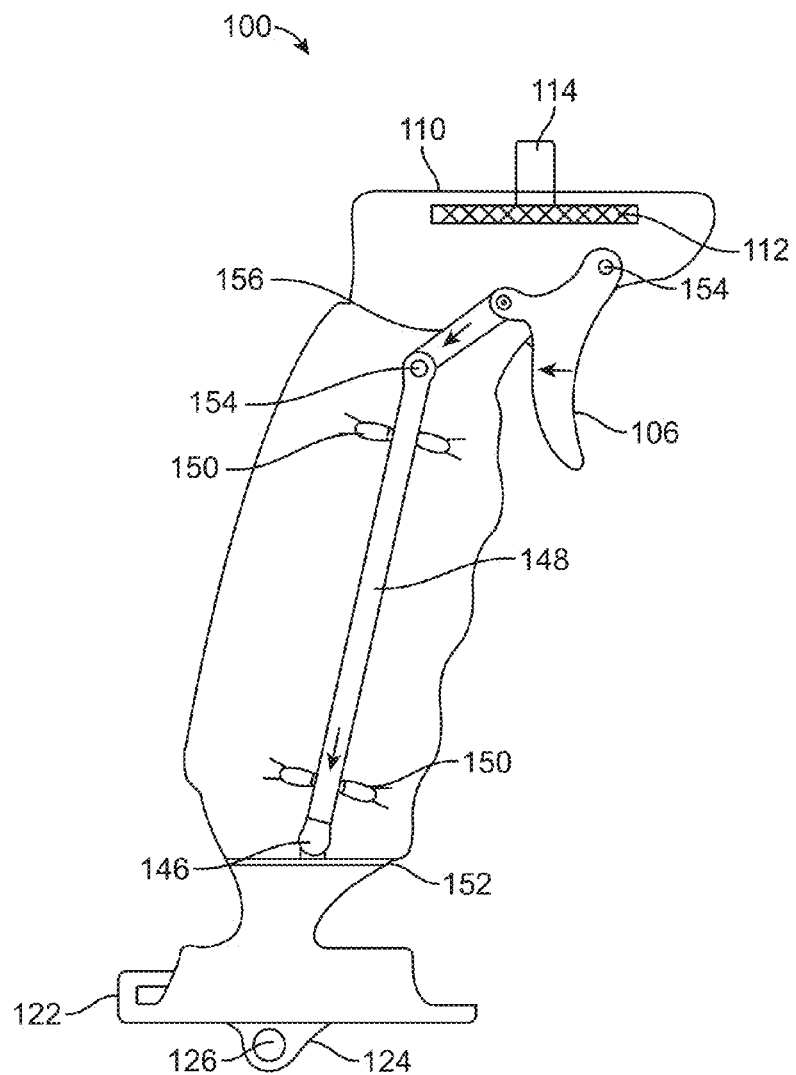
FIG. 6 shows a lateral internal view of a hand-held device consistent with implementations of the current subject matter with no camera attached.

FIG. 6 illustrates an internal lateral view of a hand-held device 100 with no camera attached and no remote control device 104 attached. The hand-held device 100 also shows the upper surface 110 for mounting a camera as well as a thumbwheel 112, and a ¼"-20 114. This illustration also includes the retaining clip 122, accessory mounting component 124, and pass-through holes 126. This internal lateral view shows one of many possible mechanisms for securing and triggering a remote control device 104. Examples of camera actuation mechanisms include, but are not limited to: a encased cable actuator, a cam and rod system, a gear-driven actuator, a friction pin system, or as illustrated in the example of FIG. 6, a rod and hinge system. The rod and hinge system showed in FIG. 6 functions by tension being put on the actuation control 106, which creates motion of several interconnected components that act to press and actuate the capture button 140 on the remote control device 104. In FIG. 6, the rod and hinge system includes a hinge point 154, an initial rod 156, a main shaft rod 148, and a tip 146. Also shown in FIG. 6 are rod guides 150 to keep the actuation rod in line with the capture button 140 on the remote camera actuator 104. Also shown is an optional thin gasket 152 which can act as a buffer in between the tip 146 in the capture button 140 on the remote control device 104 to reduce wear on the remote control device 104.

Figure 7:
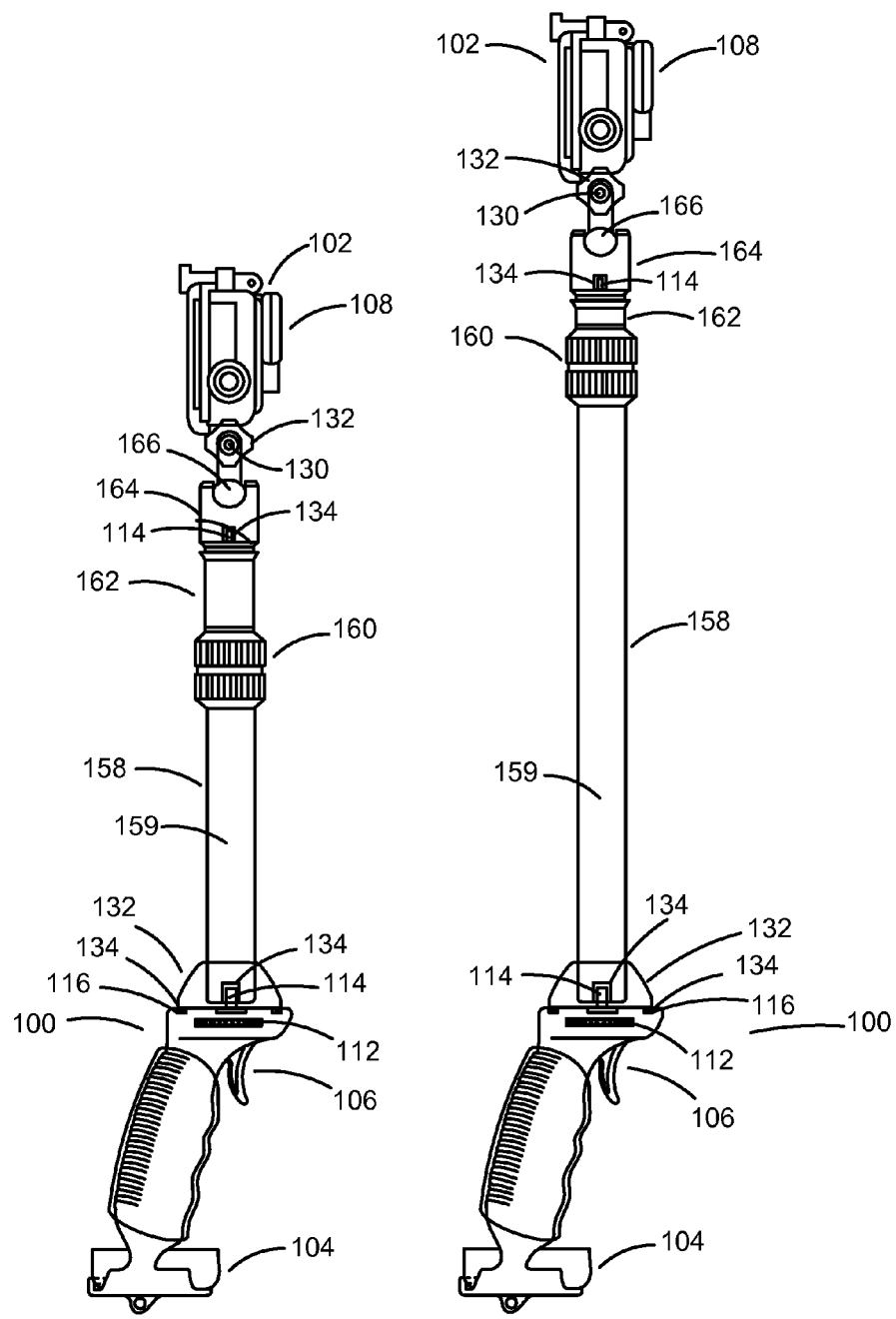
FIG. 7 shows two lateral views of a hand-held device consistent with implementations of the current subject matter with adjustable length boom extensions.

FIG. 7 illustrates a lateral view of two separate devices for mounting and triggering a camera 100 with an attached remote control device 104 with cameras 102 attached with lenses 108 facing forward and attached by an extension boom 158 at different possible extension lengths. The extension boom 158 can be constructed of any conceivable material, such as for example, fiberglass, carbon fiber, metal, plastic, etc. The base of the extension boom 158 can be secured in place by spinning a thumbwheel 112, which in turn links a ¼"-20 screw 114 to a corresponding female ¼"-20 thread 134 within a base of the boom extension 158. A clip attachment mount 132 such as is illustrated in FIG. 5 can be locked into place by the male protrusions 135 and female indentations 116 discussed above. The extension boom 158 shown in FIG. 7 can include two shafts, an outer shaft 159 and an inner shaft 162 which locks into place via a twist lock system 160. However a single shaft non-adjustable boom may be used as well. The top portion of the upper shaft 162 may also have a male ¼"-20 screw 114 and female ¼"-20 thread 134 binding point for connection with a ball head unit 164 and corresponding internal ball/camera connection point 166. Alternatively, other connective structures can be included at either end of an extension boom and/or any other structural component configured to attach to a hand-held device 100 as discussed herein. In the example of FIG. 7, the ball head unit 164 provides a complete 360 degree vertical and lateral mounting option for the camera 102 and lens 108 to face any direction.

FIGS. 8 through 45 depict various views of additional features relating to systems and methods for operating a camera 102 using a hand-held device 100 that positions the camera for action (or non-action) photos and videos while also allowing the user to actuate the camera 102 via a wireless remote control device 104 with the same hand. The features shown can be included in one or more implementations of the current subject matter. It will be understood that these examples are merely to illustrate possible configurations, structures, etc., and are not intended to be limiting on the scope of the disclosed subject matter.

Figure 8:
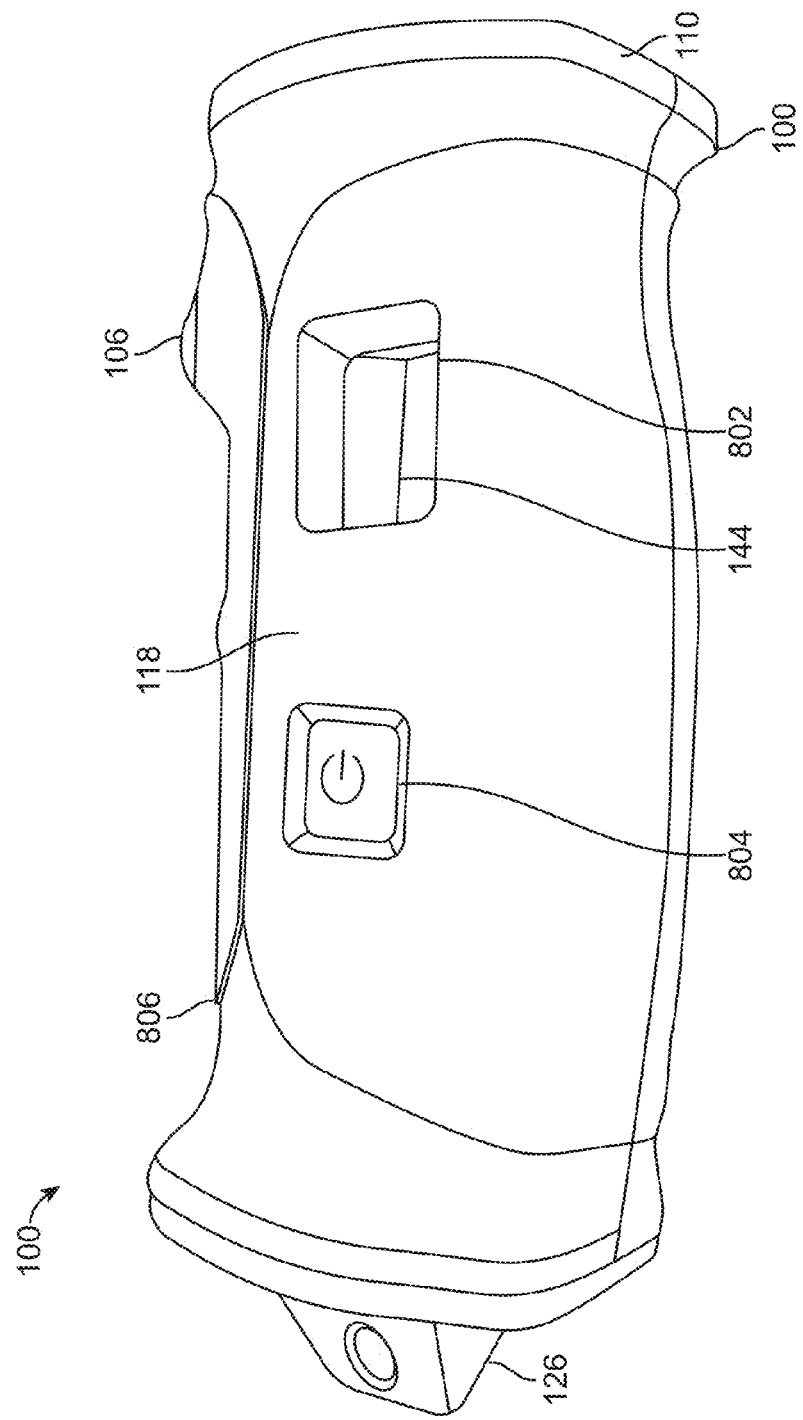
FIG. 8 through FIG. 13 show various views illustrating features of a hand-held device consistent with implementations of the current subject matter.

FIG. 8 shows a side view of a hand-held device 100 implementation shaped to have a pistol-type grip 118 around a hollow body configured to enclose a remote control device 104 for a camera 102, which can be attached at an end of the hand-held device 100. In this example and in other views of a similar device that follow and are described below, the second mounting feature includes a cavity (e.g. a remote control compartment) within a body of the hand-held device 100 that is configured to receive a remote control device 104. As depicted, a window 802 in the side of the grip 118 can allow for visibility of a screen 144 on the remote control device 104. Additionally, a button 804 can be provided to allow a user to turn the remote control device 104 on or off, to advance through user interface menus displayed on the remote control device screen 144, etc., for example by actuating or allowing actuation of a mode or power button 142 on the remote control device 104. The button 804 can optionally include a simple cutout to allow direct actuation of a mode or power button 142 (or other button or control) on an remote control device 104 secured within the cavity. Alternatively the button 804 can be moveable or flexible such that user actuation of the button causes a corresponding button on the remote control to be actuated. A hinged door 806 can secure the remote control device 104 within the cavity. A pass-through hole 126 can be attached to the device for mounting and triggering a camera 100 discussed below. Also shown in FIG. 8 is an actuation control 106, which in this example resembles a pressable button.

Figure 9:
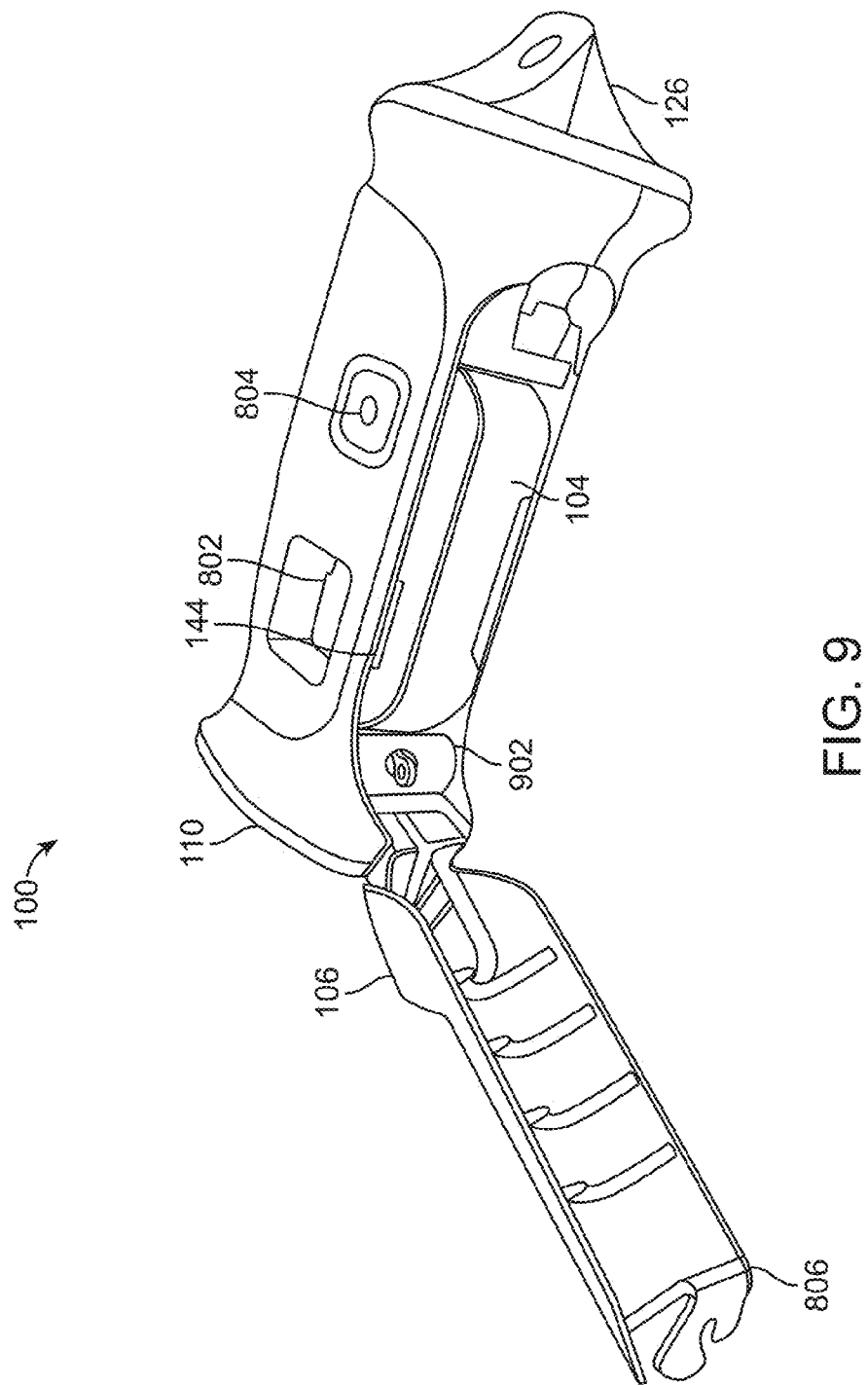

FIG. 9 shows another view of a hand-held device 100 illustrating an example of a remote control compartment 902 accessible by a hinged door 806 on one side of the hand-held device 100. The remote control compartment 902 can, but need not, be waterproof, and can optionally be sized and shaped to receive a specific size and shape of a remote control device 104. In some implementations of the current subject matter, a remote control compartment 902 can have a generic size and shape capable of containing more than one type of remote control device 104. In these implementations, one or more spacers, securing pieces, etc. can be included to adapt the remote control compartment 902 to properly receive a given remote control device 104.

Figure 10:
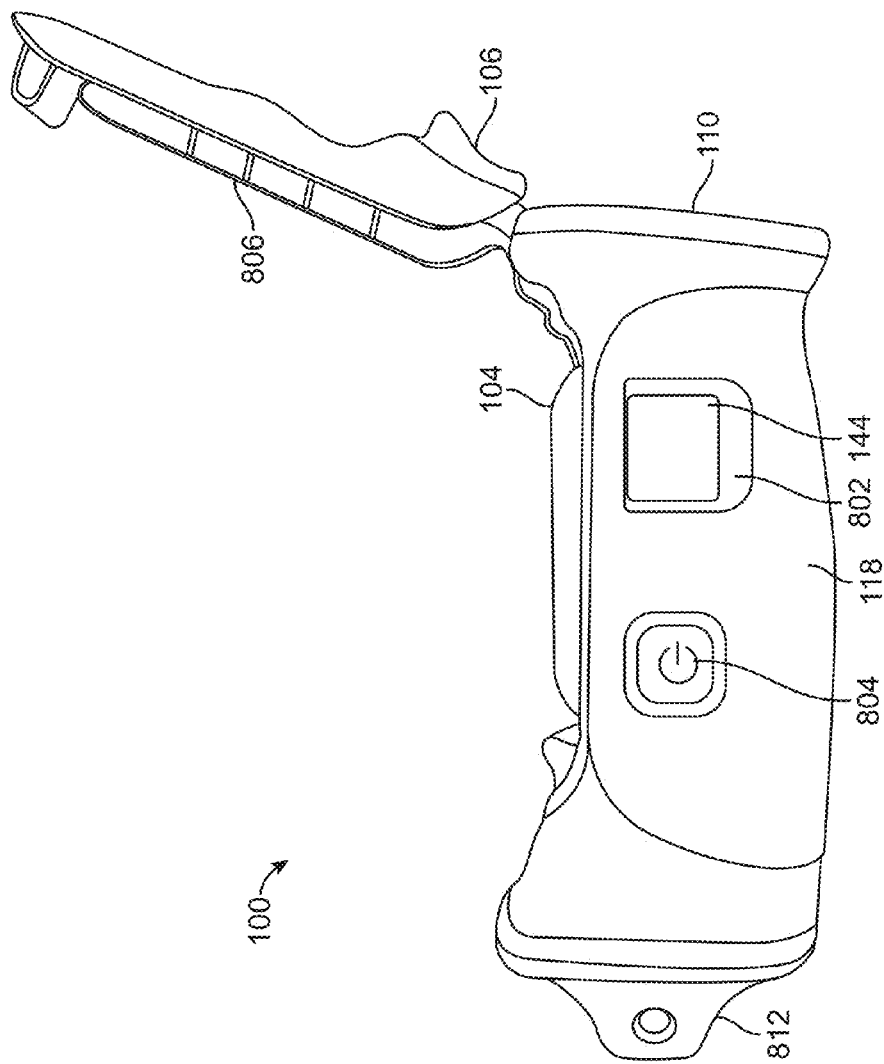
Figure 11:
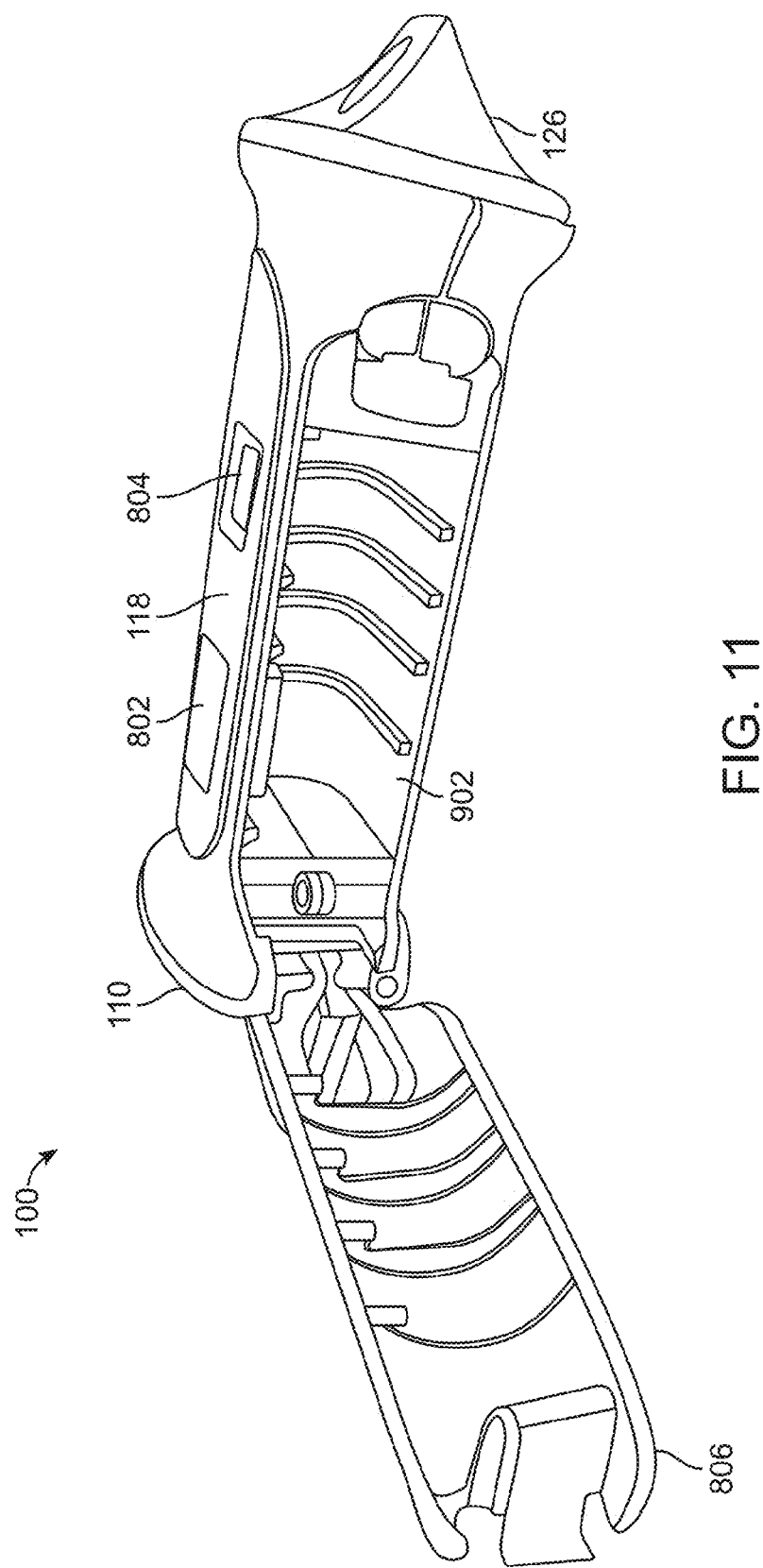

FIG. 10 shows an additional view of a hand-held device 100 with the hinged door 806 of the remote control compartment 902 open. Also visible are the window 802 to the remote control screen 144 and the button 804 discussed above in reference to FIG. 8. FIG. 11 shows another view of the hand-held device 100 with the remote control device 104 removed from the remote control compartment 902.

Figure 12:
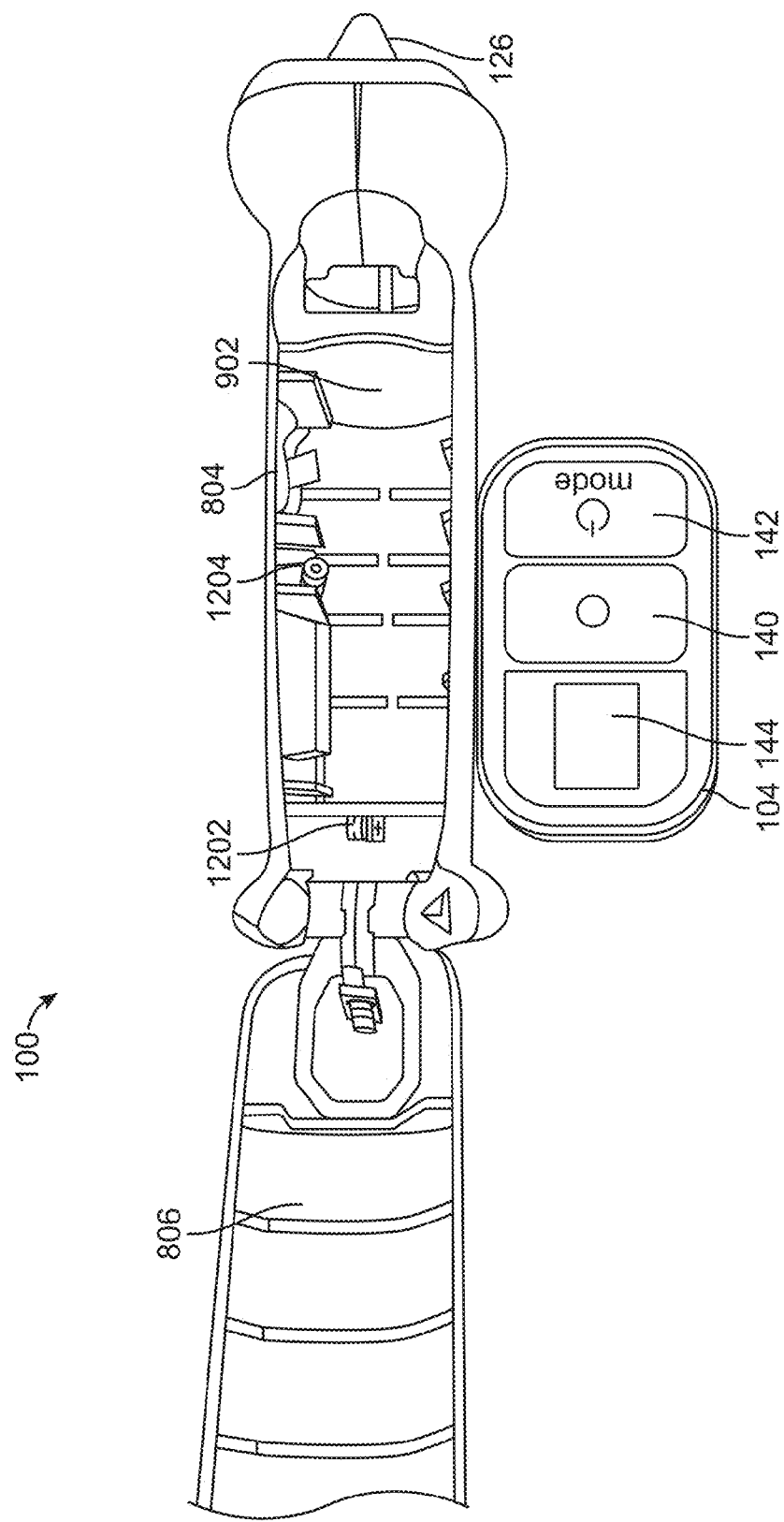
Figure 13:
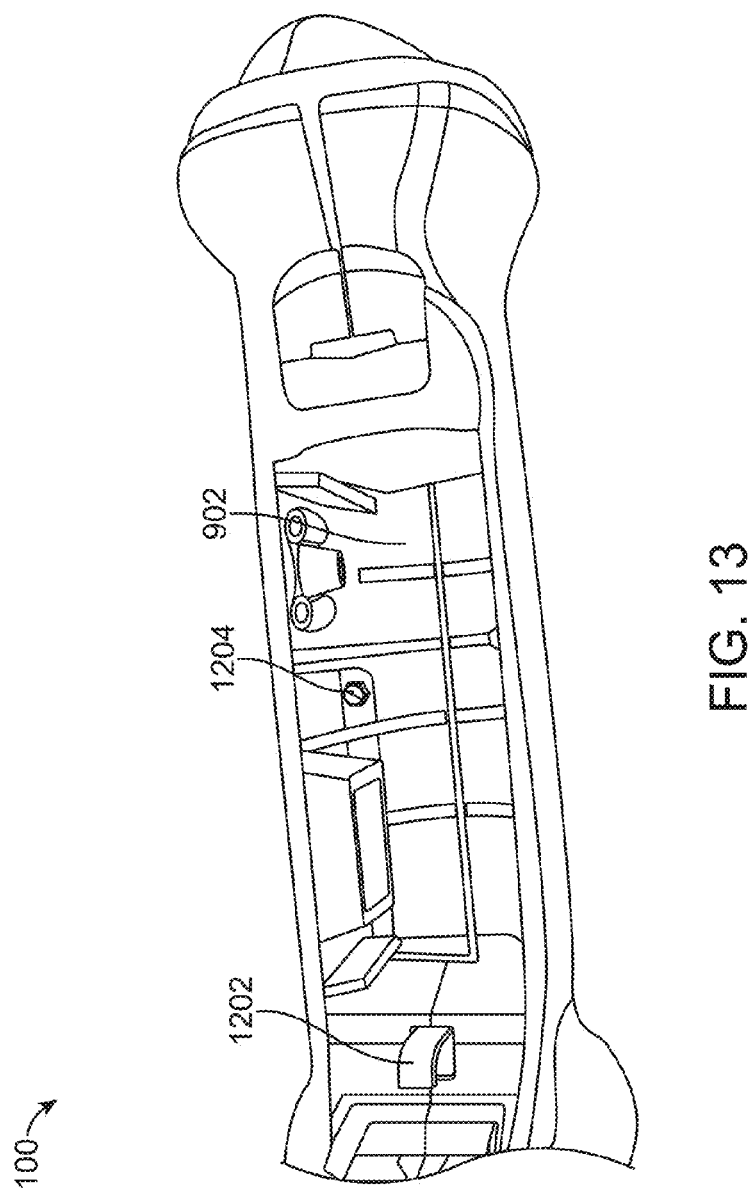

FIG. 12 shows a front view with a remote control device 104 positioned next to a hand-held device 100, and FIG. 13 shows a view illustrating additional features of the remote control compartment 902. In these views, parts 1202, 1204 of an actuation mechanism for the capture button 140 on the remote control device 104 is visible. An actuation control (e.g. a trigger-like button) 106 on the hinged door 806 can, when pressed by the user, urge a protrusion 1202 inward toward a mechanical arm 1204 that is within or in communication with the remote compartment 902. The mechanical arm 1204 can thereby be deflected to press the capture button 140 on the remote control device 104. In this manner, a user holding the hand-held device 100 in a hand can comfortably hold the hand-held device 100 (thereby supporting a camera and/or any devices attached to the hand-held device 100, such as for example those additional components discussed above and below) and with a finger of the same hand actuate the actuation control 106 to cause the capture button 140 on the remote control device 104 to be depressed. Doing so can cause a camera controlled by the remote control device 104 to take one or more photographs, start or stop capturing video and/or audio, or the like.

Figure 14:
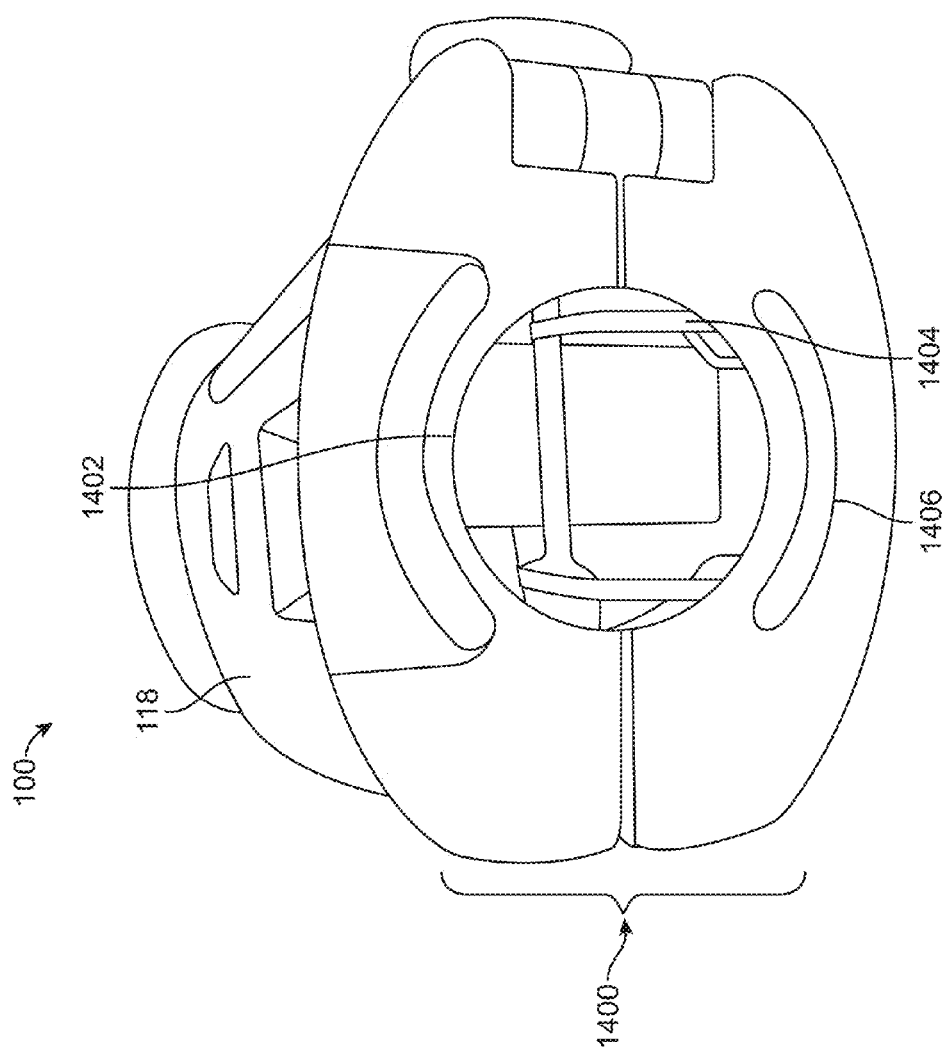
FIG. 14 through FIG. 18 show various views illustrating mounting features for connecting a hand-held device to a camera and/or other component consistent with implementations of the current subject matter.

FIG. 14 shows an end view of the hand-held device 100 illustrating features of an example first mounting feature receiving structure 1400 which can be used to mate the pistol grip 118 to other components of a mounting and actuating system consistent with implementations of the current subject matter. As shown, the hand-held device 100 can include a socket structure 1402 at one or optionally both ends. The socket structure 1402 can include a retaining piece 1404 (optionally metal, described in more detail below) as well as one or more guide channels 1406 (two are shown in FIG. 14) for receiving guide pins on a mating structure of a removable part of the first mounting feature 1400.

Figure 15:
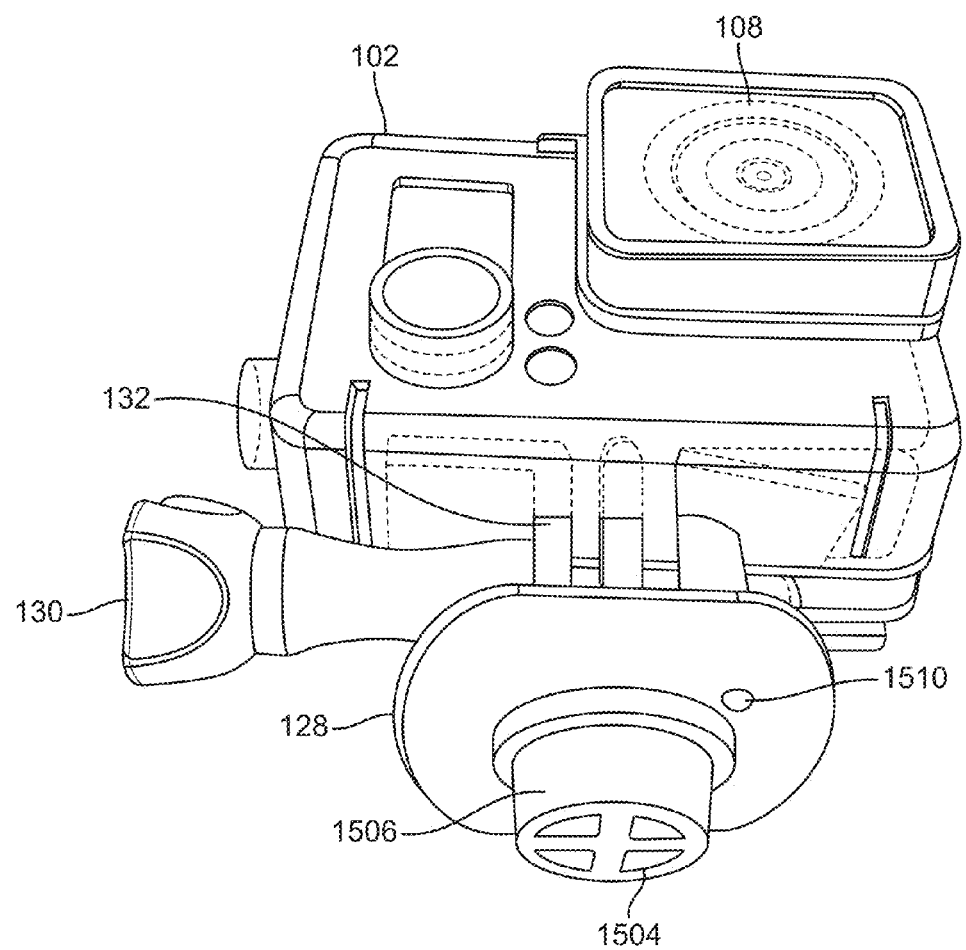

FIG. 15 shows an example of a camera 102 attached to another type of intermediate mounting structure 128 that can form part of a first mounting feature consistent with implementations of the current subject matter. The intermediate mounting structure 128 can optionally include protrusions and indentations 132 similar to those discussed above in relation to FIGS. 1-2 for joining to a camera 102 and/or can optionally include one or more custom or proprietary joining structures and/or generic structures for joining to any type of camera. As shown, the intermediate mounting structure 128 also includes a mating post 1504 configured to mate with the socket structure 1402 at the end of the hand-held device 100 as shown in FIG. 14. As discussed further below, various components of a first mounting feature receiving structure 1400 consistent with implementations of the current subject matter can include such connections, either as sockets or mating posts or the like, such that the components of the first mounting feature (e.g. a first mounting feature receiving structure 1400 and a mating intermediate mounting structure 128) can be assembled and disassembled in different configurations depending on the user's preferences. As shown in FIG. 15, the mating post 1504 can include side slots 1506 that cooperate with the retaining piece 1404 as well as one or more guide pins 1510 that cooperate with the guide channels 1406 near the socket structure 1402 on a mating surface of the hand-held device 100. In operation, an intermediate mounting structure 128 with a mating post 1504 can be joined to a first mounting feature receiving structure 1400 with a socket structure 1402 by inserting the mating post 1504 into the socket 1402 with the two pieces rotated such that they are aligned at approximately 90° relative to their final joined orientation. This approach to joining allows the mating post 1504 to slide past the retaining piece 1404 along sides of the mating post 1504 that are effectively smooth. Rotating of the two joining parts by approximately 90° after the mating post 1504 is inserted into the socket 1402 causes the retaining piece 1404 to slide into the slots 1506 on the mating post 1504 to prevent the mating post 1504 from sliding back out of the socket 1402. The guide pins 1510 and guide channels 1406 can assist in causing the rotation to stop at approximately 90° after insertion of the mating post 1504 into the socket 1402. Socket structure 1402 and mating post 1504 connector arrangements such as those discussed here in can support joining of the two respective components in either orientation. For example, a camera 102 mounted using first mounting feature structures consistent with those discussed herein can be oriented to face forward on a hand-held device 100 and also or alternatively oriented to face backwards (toward the user) using the same connector.

FIG. 16 shows a view of an opposite end of the hand-held device 100, which can also include a socket structure 1402 similar to that shown previously. In FIG. 16, a pass-through hole 126 similar to those previously discussed is also shown as part of another connector 1600 that can be joined to the hand-held device 100. This connector 1600 that includes the pass-through hole 126 can include on an opposite side from the hole 126 a mating post structure 1504 similar to those discussed above such that it can be joined to any available socket structure 1402, including for example either socket structure 1402 on the hand-held device 100, or sockets on any other parts of a multi-component system consistent with implementations of the current subject matter.

Figure 16A:
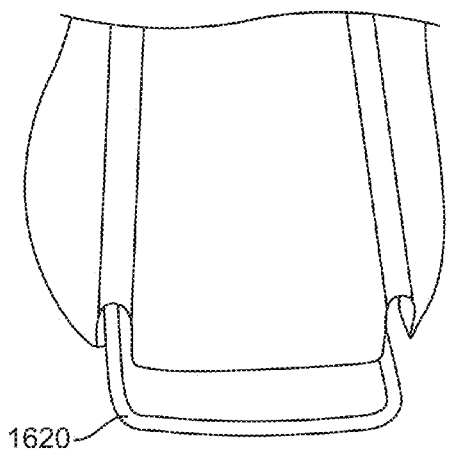
Figure 16B:
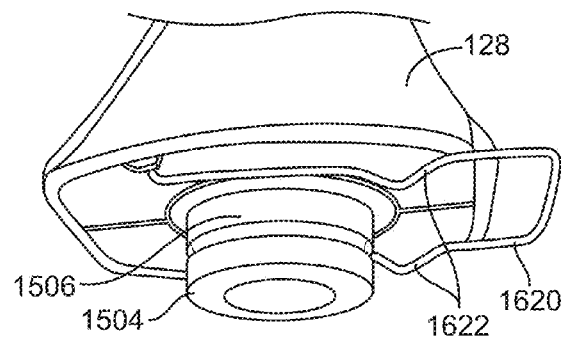
Figure 16C:
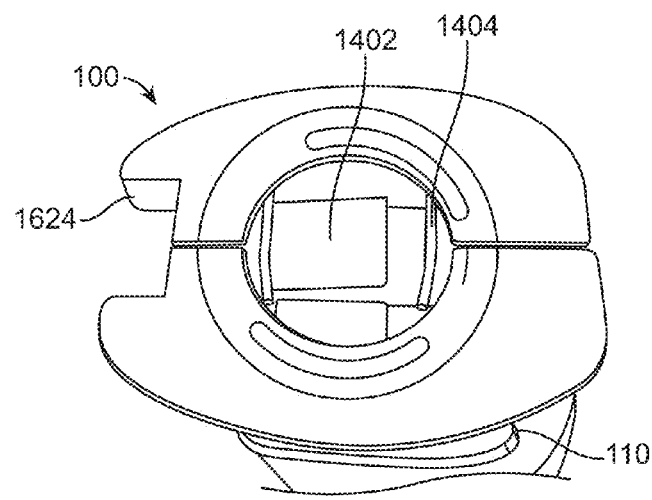

FIG. 16A, FIG. 16B, and FIG. 16C show views illustrating further features that can be included in implementations relating to the socket structure 1402 and mating post 1504 connector arrangements discussed above. A locking bar 1620 can be included as part of an intermediate mounting structure 128. The locking bar 1620 can include a part that protrudes some distance away form an outer surface of the intermediate mounting structure 128 and/or the hand-held device 100 or other apparatus that includes the socket structure 1402 for receiving the mating post 1504 on the intermediate mounting structure 128. The locking bar 1602 can include one or more locking features, such as for example the bends 1622 shown in the locking bar 1620 of FIG. 16B. These locking features 1622 can engage with locking receiving features (e.g. a recessed section 1624 as shown in FIG. 16C) when the intermediate mounting structure 128 is oriented in a locked position relative to the hand-held device (or other first apparatus that includes the socket structure 1402). When the locking features 1622 and locking receiving features 1624 are engaged, rotation of the intermediate mounting structure 128 (or other second apparatus that includes the mating post 1504) relative to the hand-held device 100 (or other first apparatus including the socket structure 1402) is restricted. To rotate the two parts from the locked orientation to the insertion/removal orientation requires that a user manipulate the locking bar 1620 to cause disengage the locking features 1622 to disengage from the locking receiving features 1624. In the example of FIGS. 16A-16C, the manipulating of the locking bar 1620 can include pressing the protruding part in a direction away from the part having the locking receiving feature(s), which in this example is the hand-held device 100.

Figure 17:
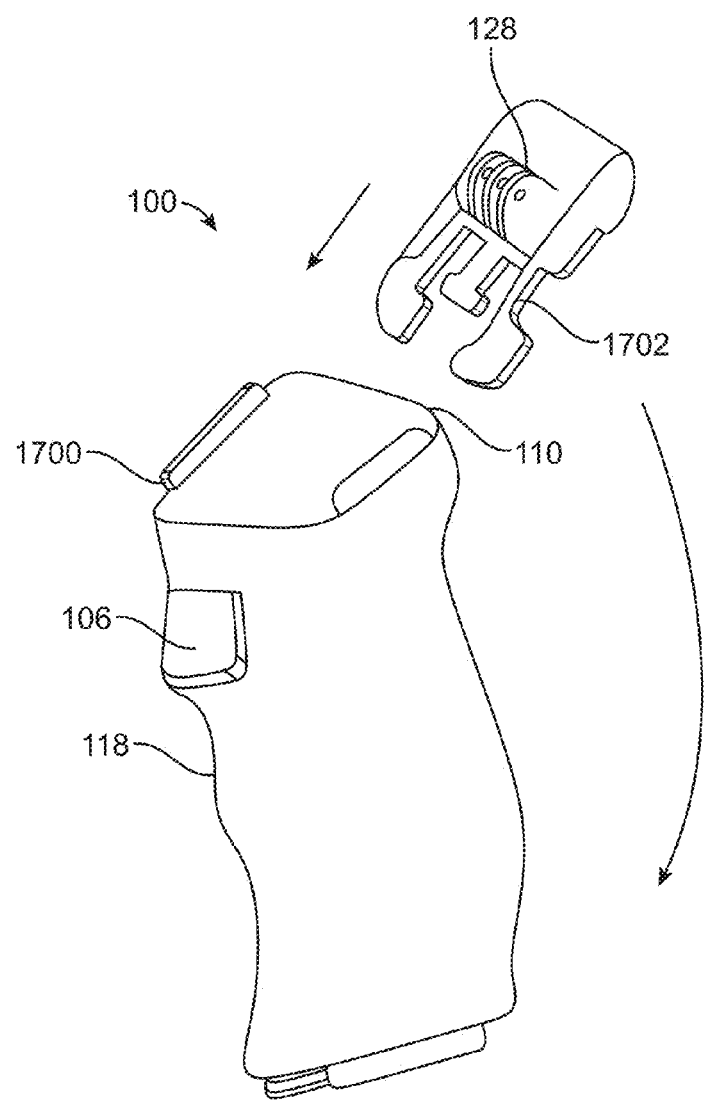
Figure 18:
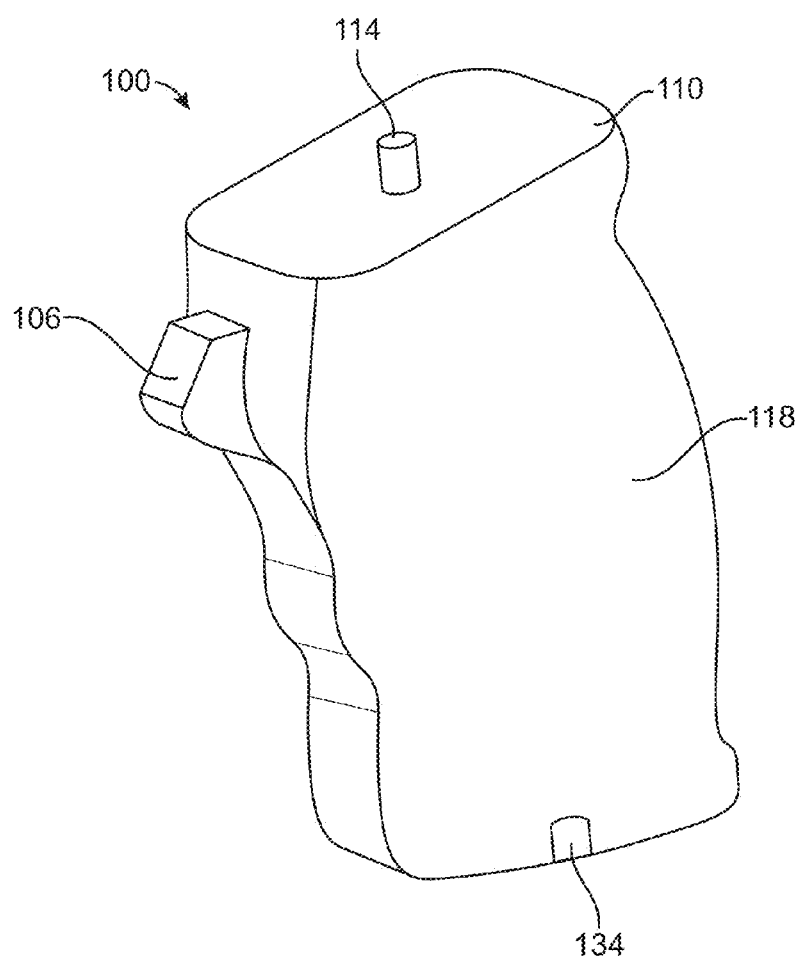

FIG. 17 and FIG. 18 show diagrams illustrating additional options for joining of components, such as a hand-held device 100 and one or more of a camera 102, an extension pole, a trekking pole, leash tie pieces, handles or bases, etc. In FIG. 17, the connector can include a female clip 1700 and an intermediate mounting structure 128 that includes a male clip 1702 joined or capable of being joined to a camera 102 or other device. In FIG. 18, threaded screw 114 and female thread 134 connectors, such as for example those based on ¼"-20 threaded connectors can be used for such connections.

FIG. 19A and FIG. 19B show two views of a side grip device 1900, which can be used in conjunction with a hand-held device 100 as described and depicted herein. The side grip device 1900 can include two connectors: a first having a socket structure 1402, and a second having a mating post structure 1504. With this structure, a hand-held device 100 as described herein can be joined to the side grip device 1900 via a socket structure 1402 on one end of the hand-held device 100 joining to the mating post structure 1504 on the side grip device 1900. An intermediate mounting structure 128, such as for example one discussed previously can be joined to the side grip device 1900 using the socket structure 1402. With a camera 102 joined to the intermediate mounting structure 128, a user can hold the hand-held device 100 to support the camera 102 in a position to the side of the hand-held device 100, thereby allowing for the user to press the camera actuation button 140 on the remote 104 by depressing the actuation control 106 on the hand-held device 100. The side grip 1900 can also optionally include a threaded attachment 134 for receiving a connector of some other device, such as for example a light or the like.

Figure 20:
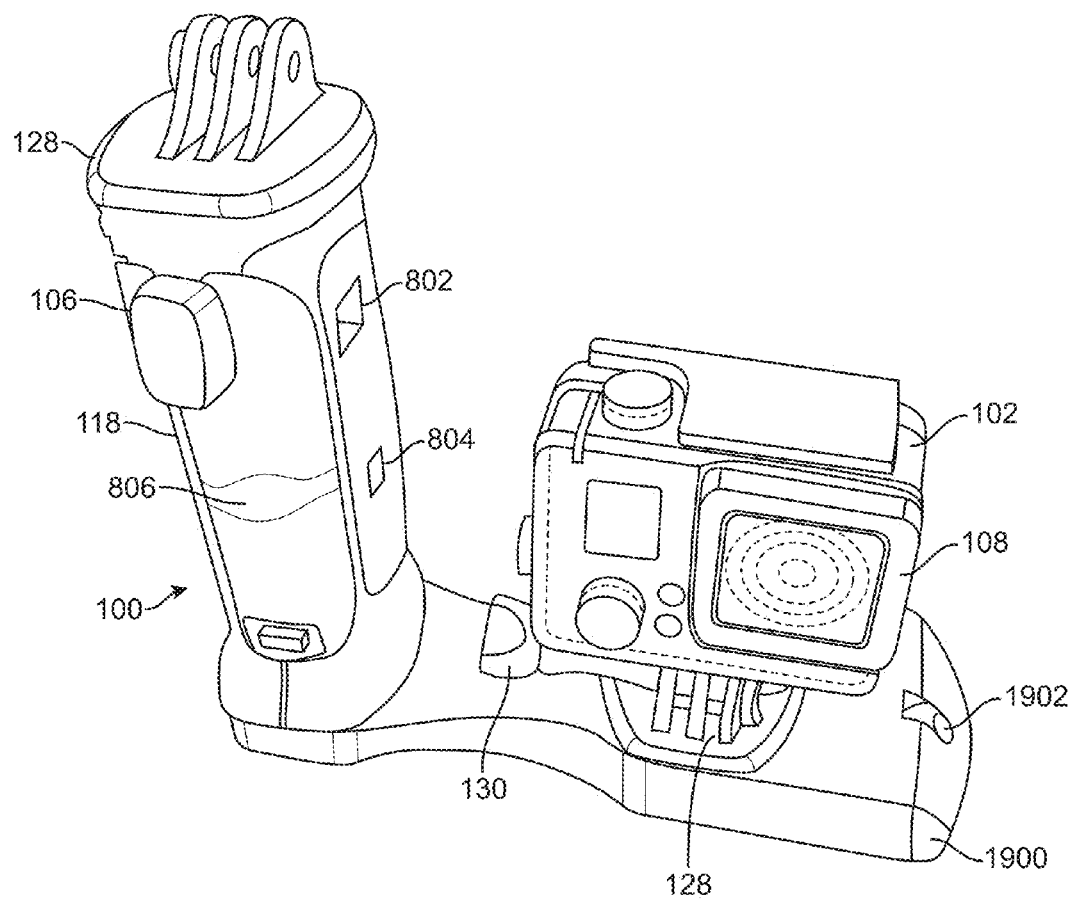

FIG. 20 shows a view of a side grip 1900 assembled to a hand-held device 100 and to a camera 102 attached to an intermediate mounting structure 128 as discussed above. At an opposite end of the hand-held device 100, an additional intermediate mounting structure 128 is also attached. The holes of the intermediate mounting structure 128 can optionally be used to accept a leash, a tie, etc.

Figure 21:
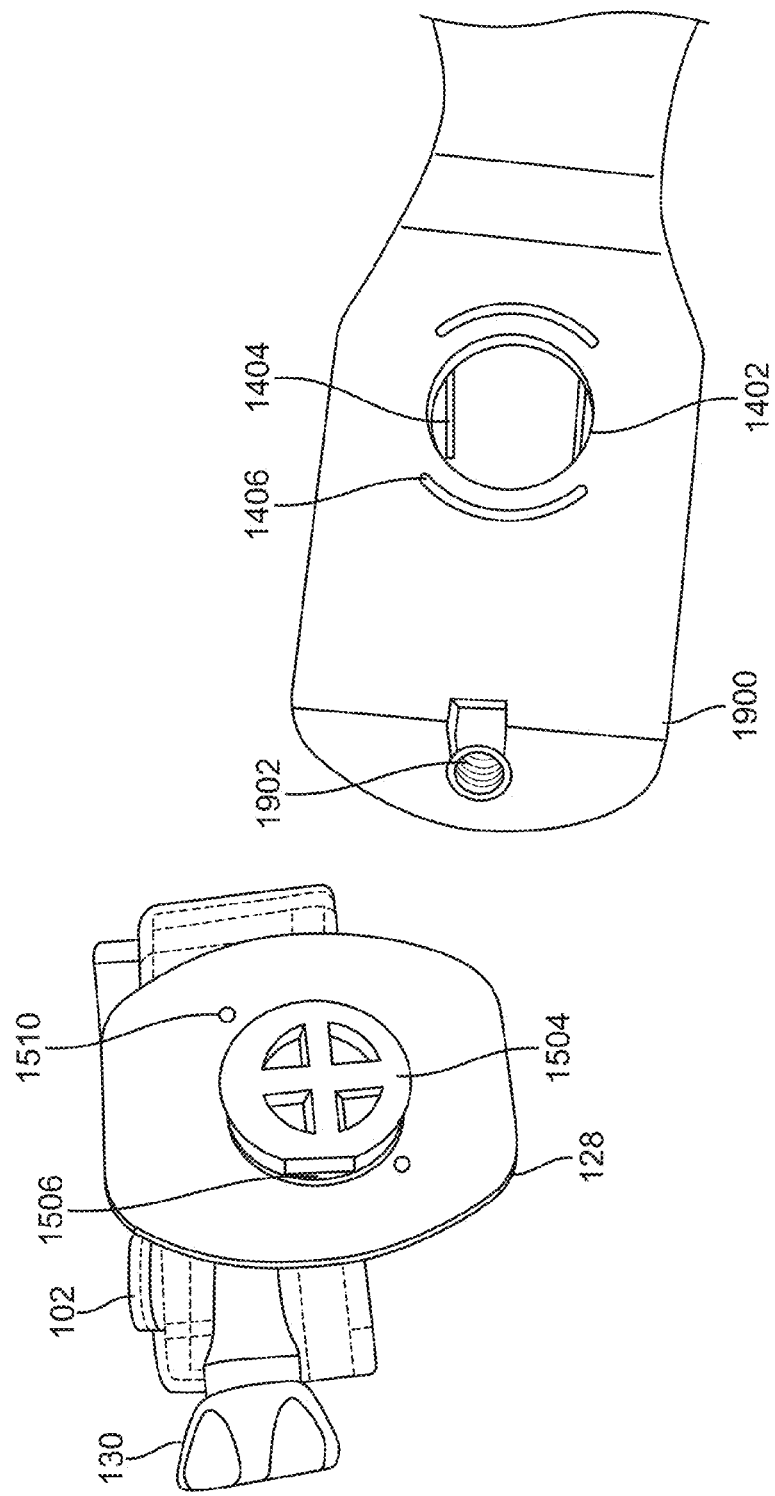

FIG. 21 shows an underside of an intermediate mounting structure 128 displayed next to a socket 1402 of a side grip device 1900. The guide pins 1510 on the underside of the intermediate mounting structure 128 can be guided by grooves 1406 positioned around the socket 1402 on the side grip 1900 as shown. Also shown in the socket structure 1402 within the side grip device 1900 is part of a retaining piece 1404.

Figure 22:
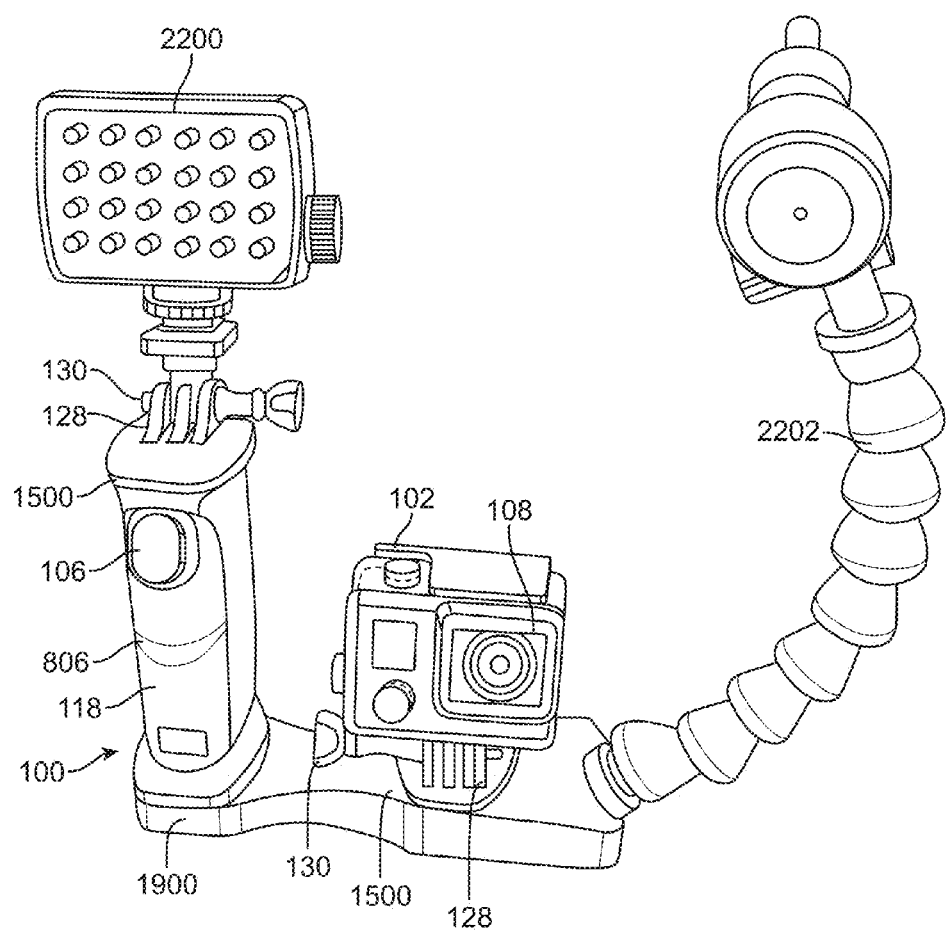

FIG. 22 shows a side grip device 1900 arranged with possible attachments. A hand-held device 100 can be attached to the side grip device 1900 as shown. The hand-held device 100 is shown with a possible attachment, in this case a light 2200, connected via an intermediate mounting structure 128. A camera 102 can be attached to a side grip device 1900 via another intermediate mounting structure 128, and a "Gooseneck" attachment 2202 can also be attached via a threaded attachment or other type of attachment. A user can make such any other arrangements with a side grip device 1900 that can allow the user to hold a hand-held device 100 and actuate a actuation control 106 to depress a capture button 140 on an integrated remote control device 104 while supporting additional desired devices with a side grip device 1900.

Figure 23A:
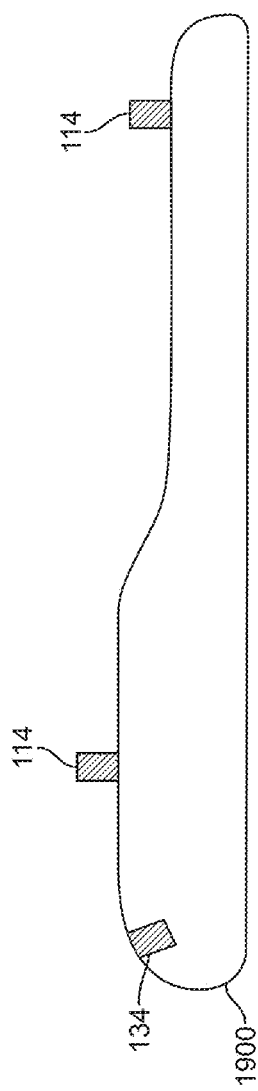
Figure 23B:
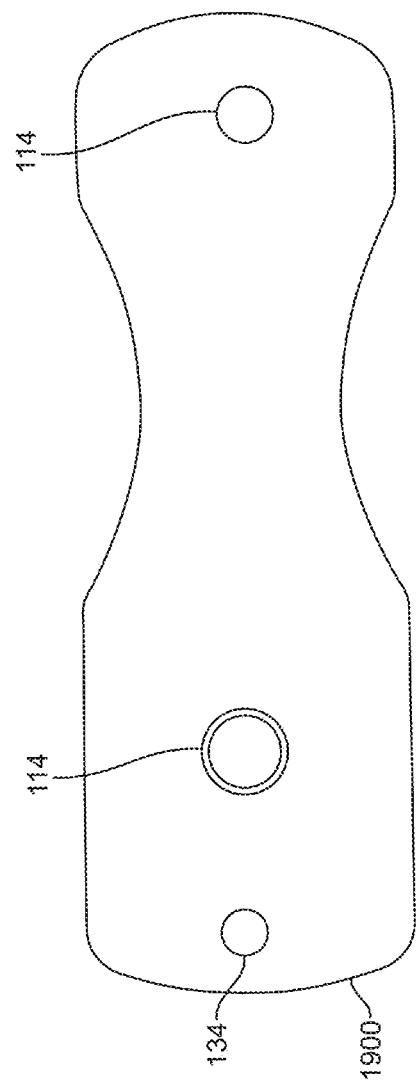
Figure 24:
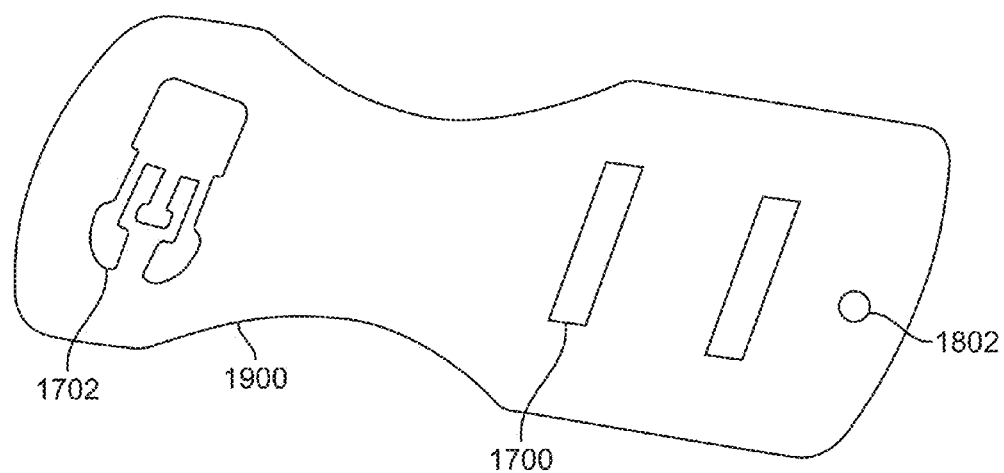

FIG. 23A, FIG. 23B, and FIG. 24 show additional diagrams illustrating other options for connecting components including but not limited to those discussed herein to a side grip device. For example in FIG. 23A, the side grip device 1900 can include threaded sockets 134 for receiving ¼-20 threaded devices and can also include one or more ¼-20 threaded posts 114 for joining to threaded sockets. It will be understood that while the current disclosure discusses ¼"-20 threads, other thread dimensions are within scope of the current subject matter. FIG. 23B shows a top view of the side grip device 1900 depicted in FIG. 23A.

The side grip device shown in FIG. 24 includes a male clip 1702 and a female clip 1700 for joining two corresponding clip type connectors on other components of a system consistent with implementations of the current subject.

Figure 25A:
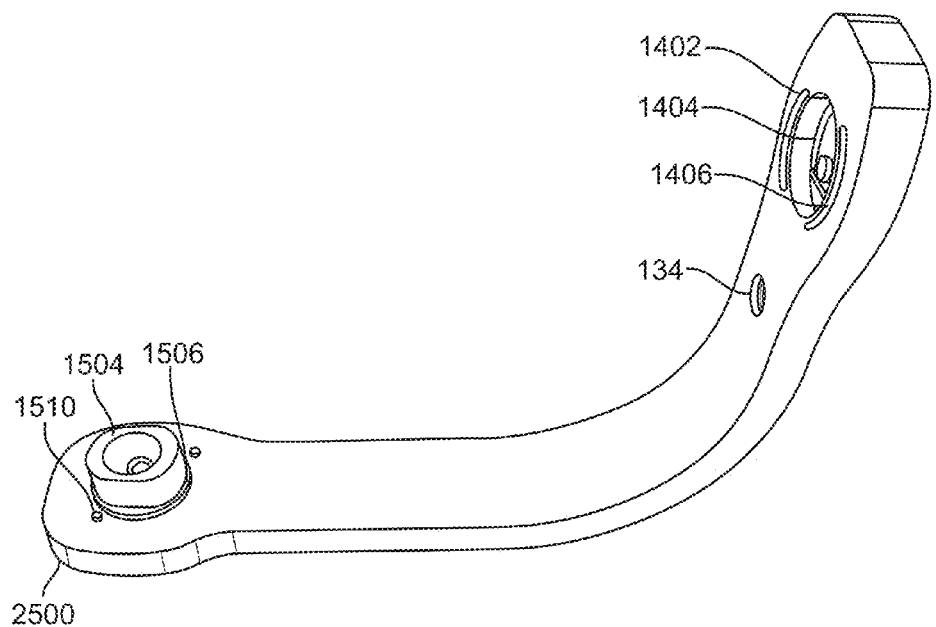
Figure 25B:
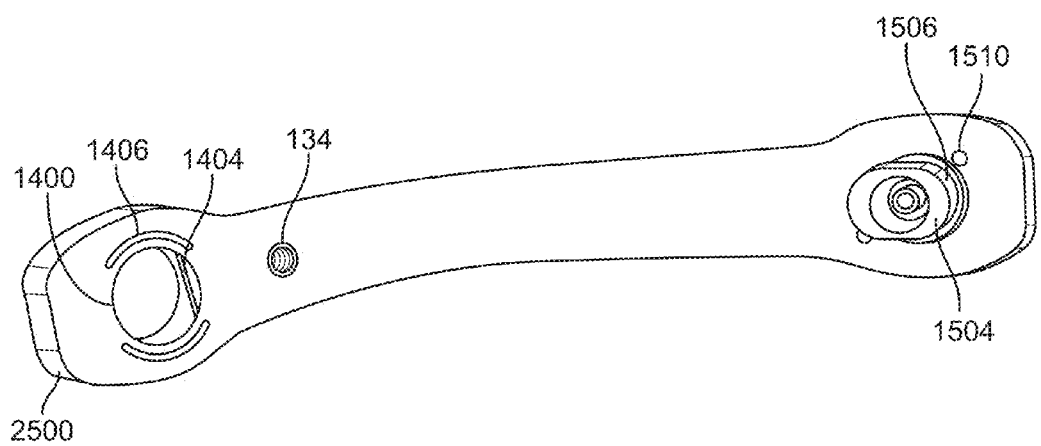
Figure 26:
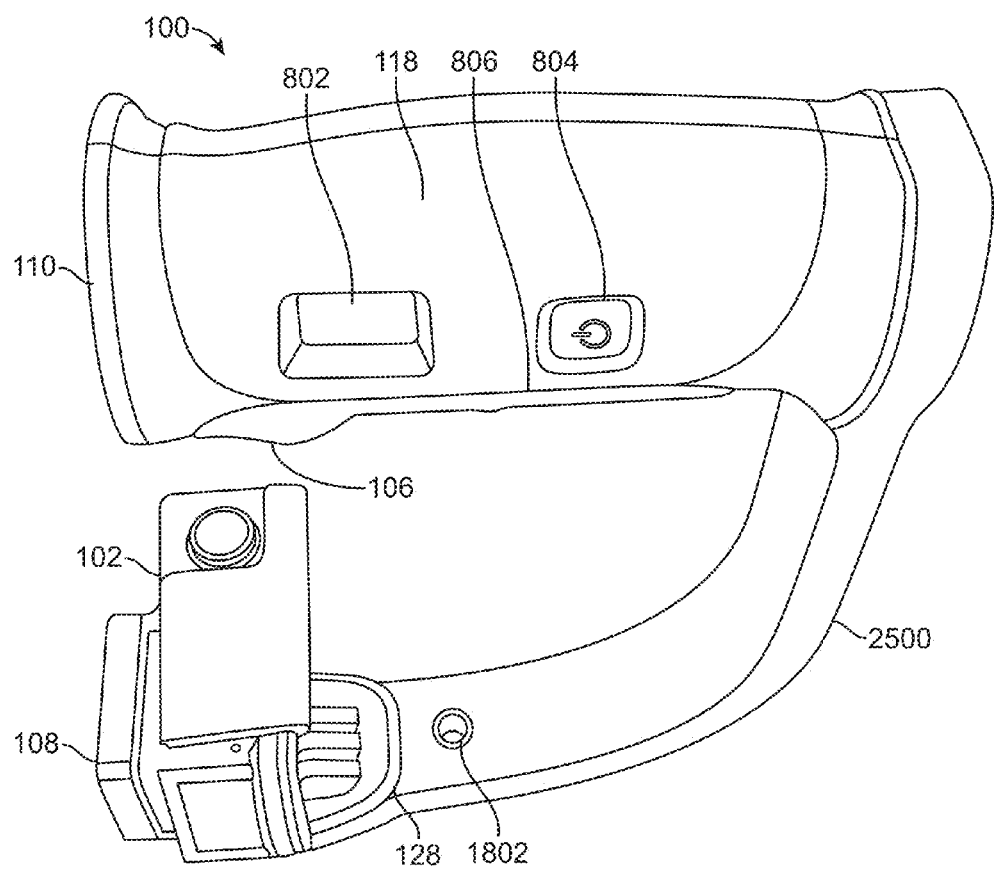
Figure 27:
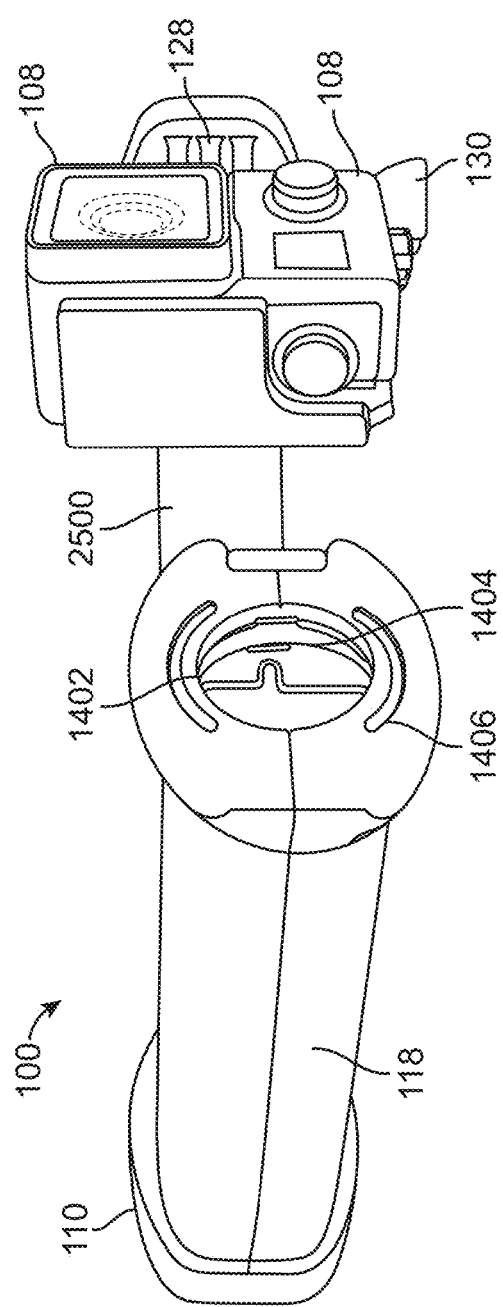
Figure 28:
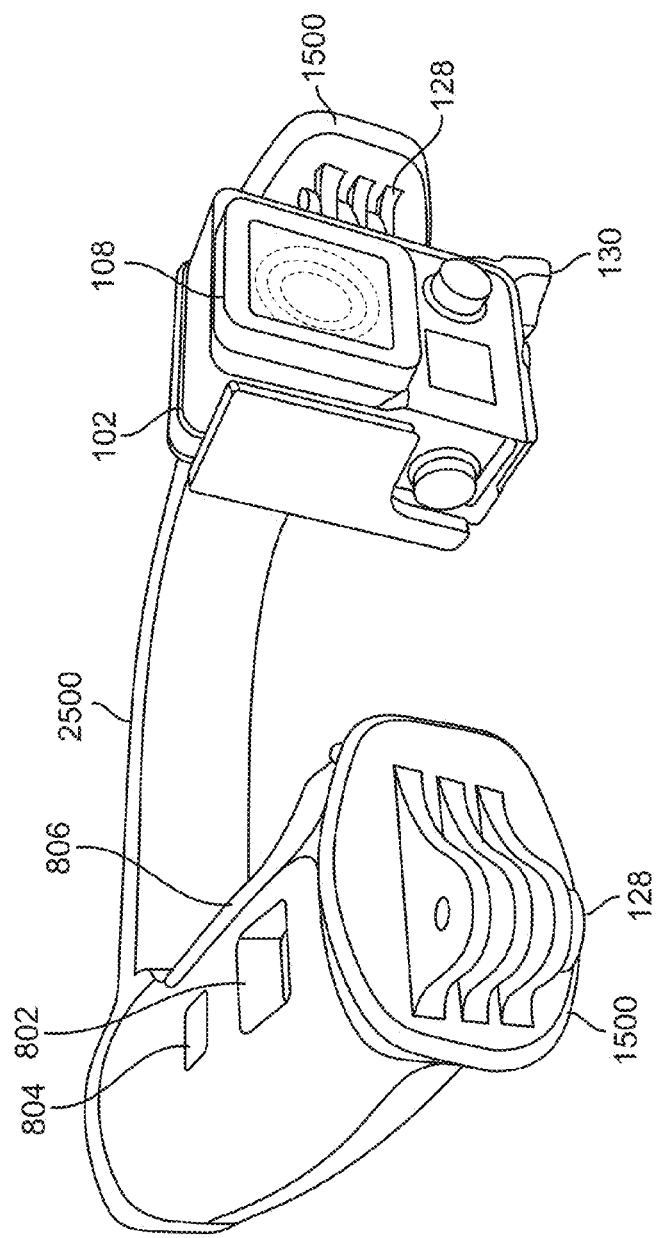

FIG. 25A and FIG. 25B show to views of a suitcase type grip 2500 consistent with implementations of the current subject matter. A suitcase grip 2500 consistent with this disclosure can allow mounting of a hand-held device 100 and a camera 102 (or two other components) with the two pieces oriented at a 90° angle (or other angle, depending on the configuration of the suitcase grip 2500) to each other. FIG. 26, FIG. 27, and FIG. 28 shows views of a hand-held device 100 and a camera 102 connected in this manner. As shown, a user can hold the hand-held device 100 with the camera 102 supported by a first intermediate mounting structure 128 connected to the suitcase grip 2500 in a position below the hand-held device 100. This arrangement can allow a user who is riding a snowboard or skateboard, ski, a surfboard, a bicycle, or other piece of sporting equipment to support the camera 102 in a forward facing manner with his or her hand held in a relatively natural orientation. In FIG. 28, the hand-held device 100 is assembled with a second intermediate mounting structure 128 at an opposite end of the hand-held device 100 from an end of the hand-held device 100 connected to the suitcase connector 2500. The second intermediate mounting structure 128 can allow connection of a leash or other tie-on device to mitigate the chance of the user losing the camera, grip, etc. if he or she drops it while performing an active maneuver. The suitcase grip 2500 can also optionally include one or more threaded sockets 134 or other types of connectors for receiving connection of other types of devices, such as for example lights or the like. FIG. 29A and FIG. 29B show examples of a suitcase grip assembled with a camera 102, a hand-held device 100, a light 2200, a microphone 2900, etc. using various connectors.

Figure 30:
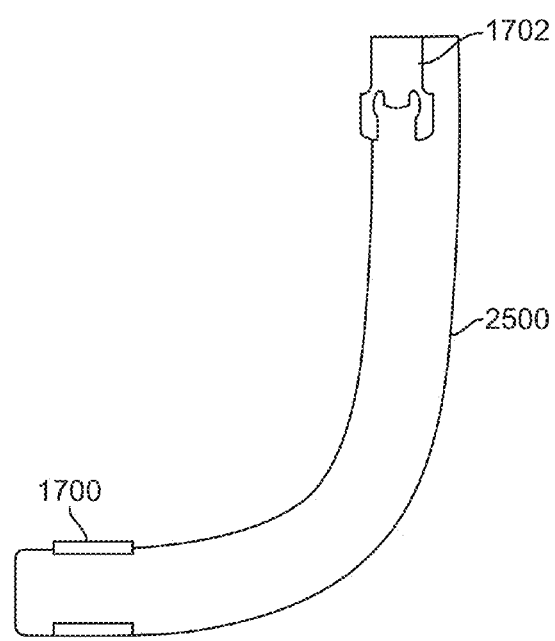
Figure 31:
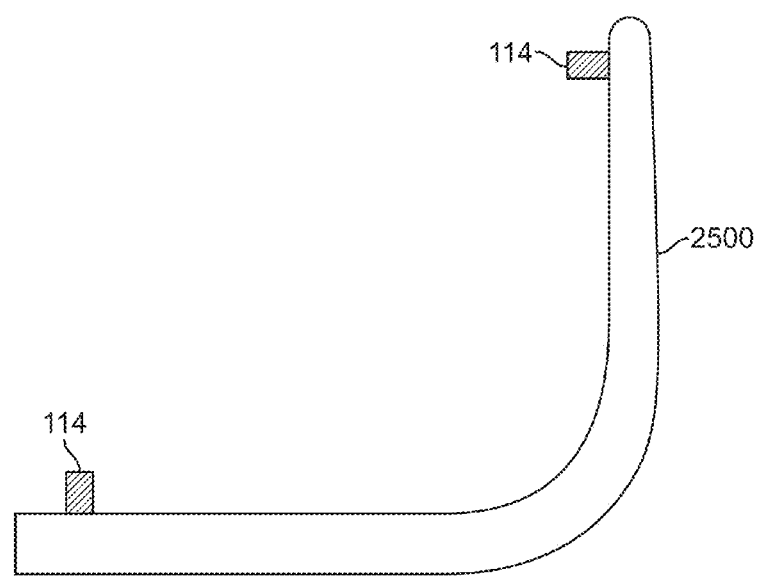

FIG. 30 and FIG. 31 show examples of suitcase grips 2500 consistent with implementations of the current subject matter in which alternative connecting approaches are used. For example, as discussed above one or more male clip connectors 1702 or female clip connectors 1700 can be used for joining to the hand-held device 100 and/or a camera 102 or other component as shown in FIG. 30. Alternatively, threaded connectors such as threaded sockets 134 and posts 114 can be used in place of the mating post 1504 and socket structure 1402 connectors as shown in FIG. 31.

Figure 32A:
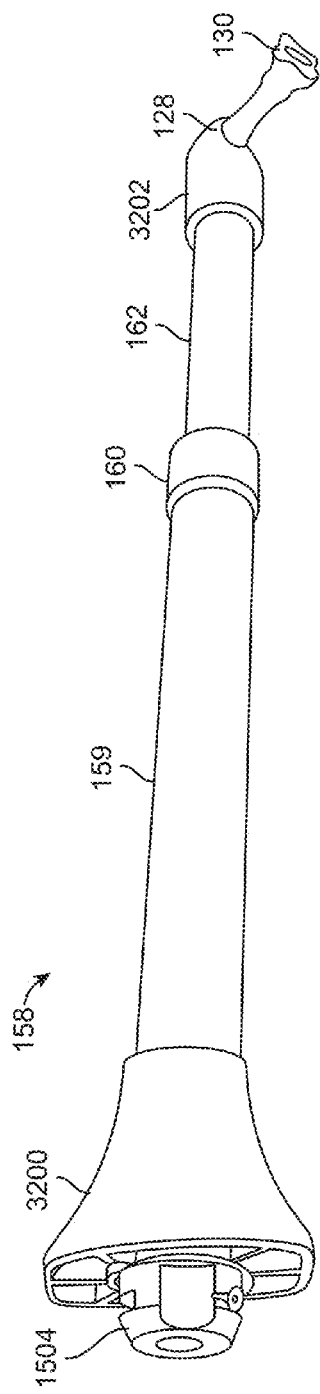
FIG. 32A through FIG. 35B show various views illustrating features of an extension boom for connecting a hand-held device to a camera and/or other components consistent with implementations of the current subject matter.
Figure 32B:
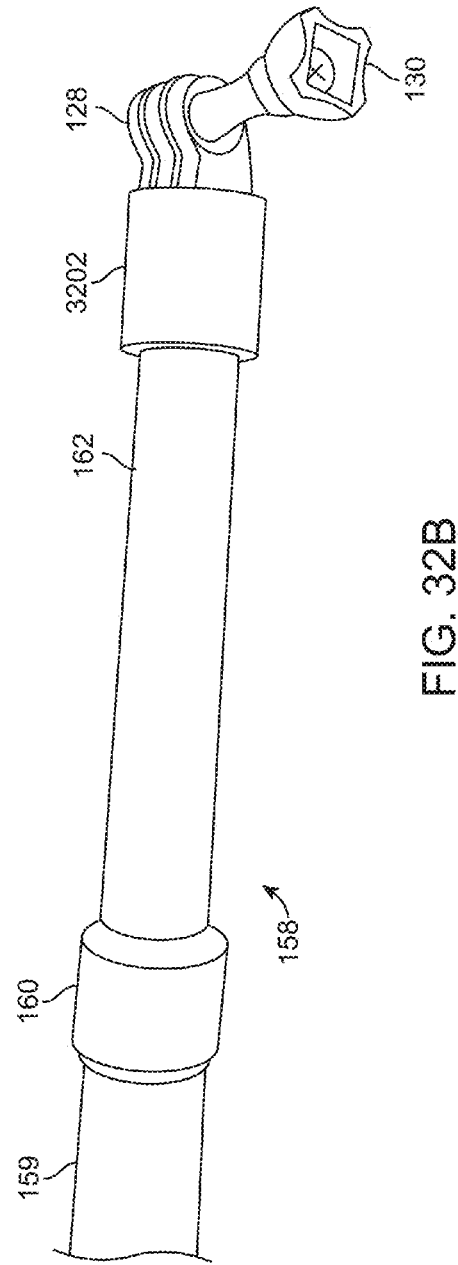
Figure 33:
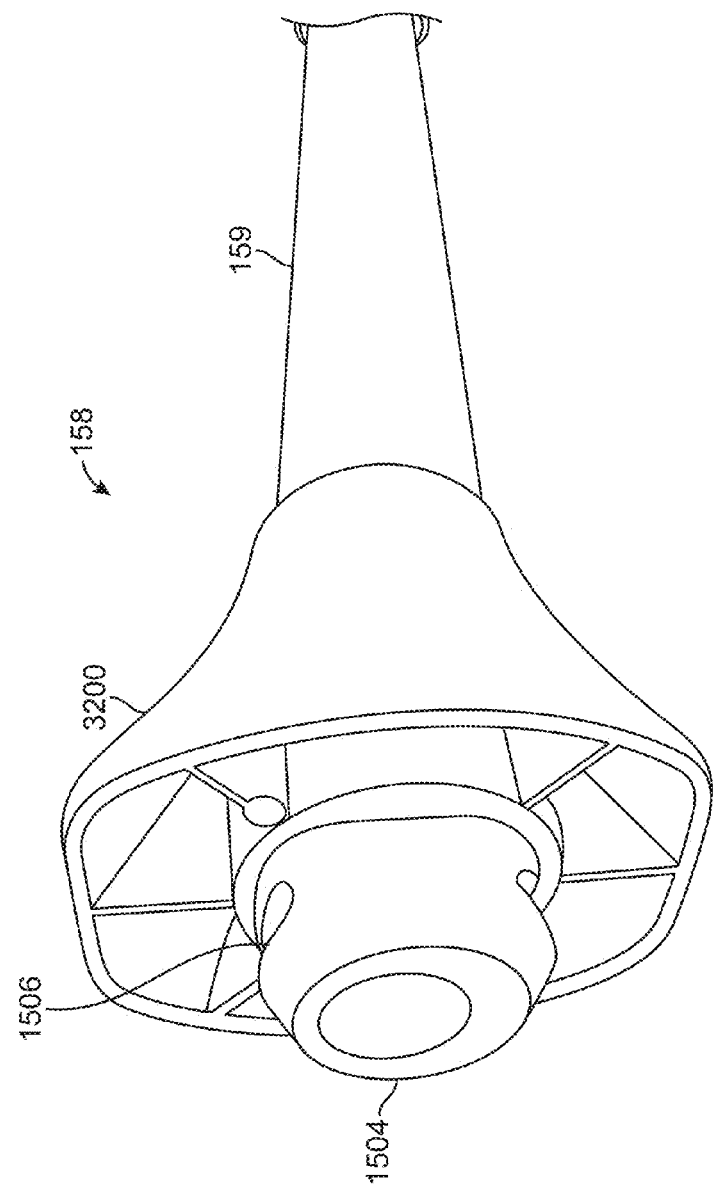
Figure 34A:
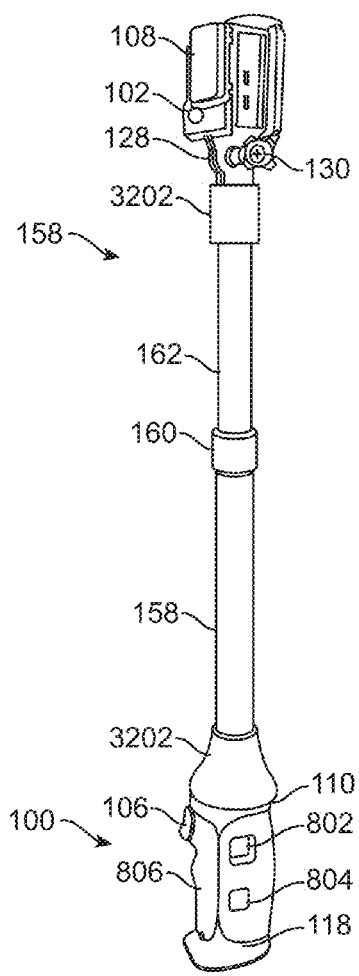
Figure 34B:
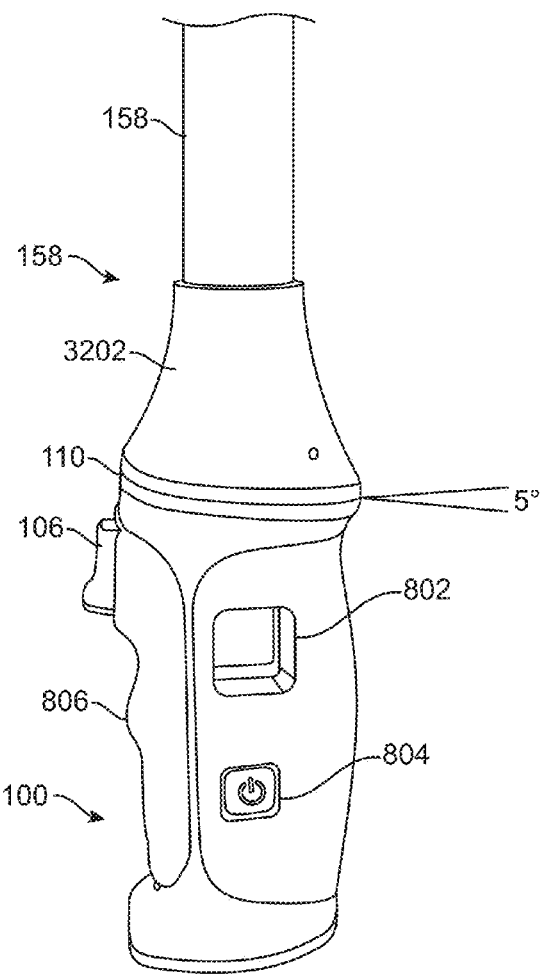

FIG. 32A and FIG. 32B show views of an extendable boom 158, which can be connected to other components of a system consistent with implementations of the current subject matter. For example, the mating post connector 1504 at the base 3200 of the extendable boom 158 can be joined to an end of a hand-held device 100, or alternatively to a suitcase grip 2500 or to a side grip 1500 using one or more of the approaches described herein for joining components. An opposite end of the extendable boom 158 can include a connector 3202 for joining to a camera 102. FIG. 33 shows a magnified view of a mating post connector 3200 at a base of an extendable boom 158. FIG. 34A and FIG. 34B show views of the extendable boom 158 attached to a top end of a hand-held device 100. As illustrated in the close-up view of FIG. 34B, the mating surface 110 of the hand-held device 100 can be formed with a slight angle relative to parallel of approximately 5°. A base of the extendable boom 158 can also have a similar angle. Accordingly, when an extendable boom 158 and the hand-held device 100 are joined in one orientation, the extendable boom 158 can extend effectively directly upward along an axis of the hand-held device 100 (e.g. with a deflection angle of approximately 0°). When an extendable boom 158 and the hand-held device 100 are joined in an opposite orientation (e.g. with the extendable boom turned 180° relative to the first orientation), the extendable boom 158 can extend upward at an angle to the axis of the hand-held device 100. In the example where the angle at the top of the hand-held device 100 and that at the base of the extendable boom 158 are both approximately 5° relative to an axis of these pieces, they reversed orientation can result in the extendable boom 158 having a deflection angle from the hand-held device 100 of approximately 10°. Other angles of the top 110 of the hand-held device 100 and the base 3200 of the extendable boom 158 are also within the scope of the current subject matter.

Figure 35A:
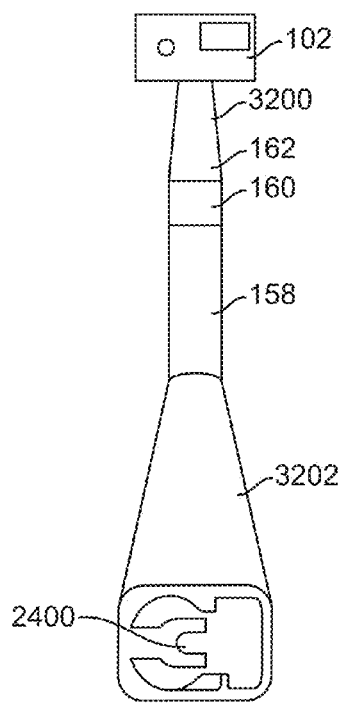
Figure 35B:
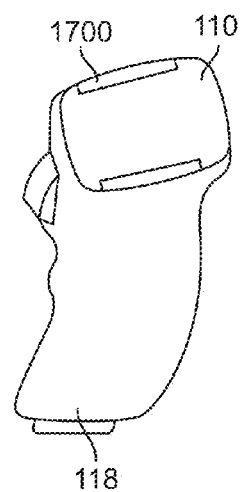

FIG. 35A and FIG. 35B show examples of alternative joining structures that can be used consistent with implementations of the current subject matter. For example, as discussed above, male 1702 and female clips 1700 can be used, for example with one type of clip at the base 3202 of the extendable boom 158 and the other type of clip configured to meet with the first type of clip at a top 110 of the pistol grip 118.

Figure 36:
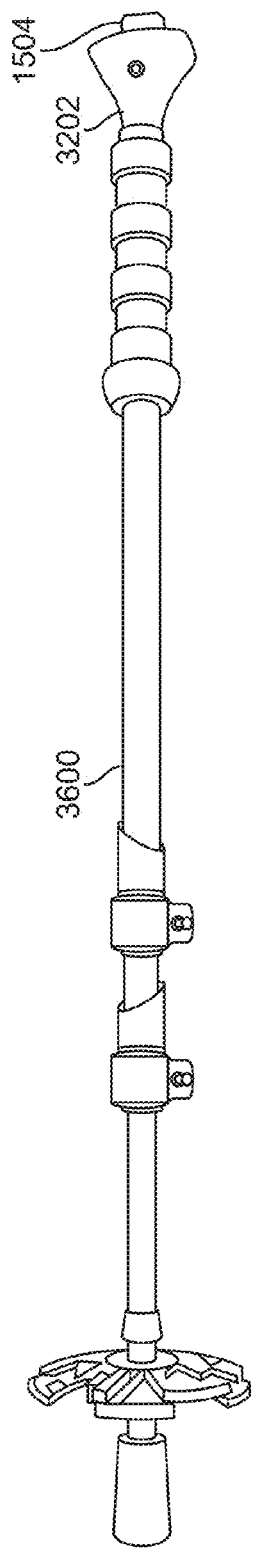
FIG. 36 through FIG. 41 show various views illustrating features of a pole device for connecting to hand-held device, a camera, and/or other components consistent with implementations of the current subject matter.
Figure 37:
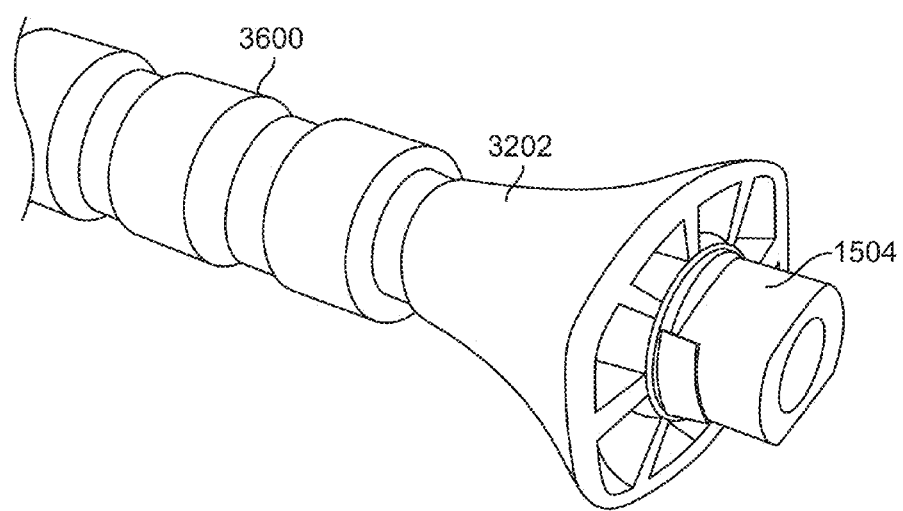
Figure 38:
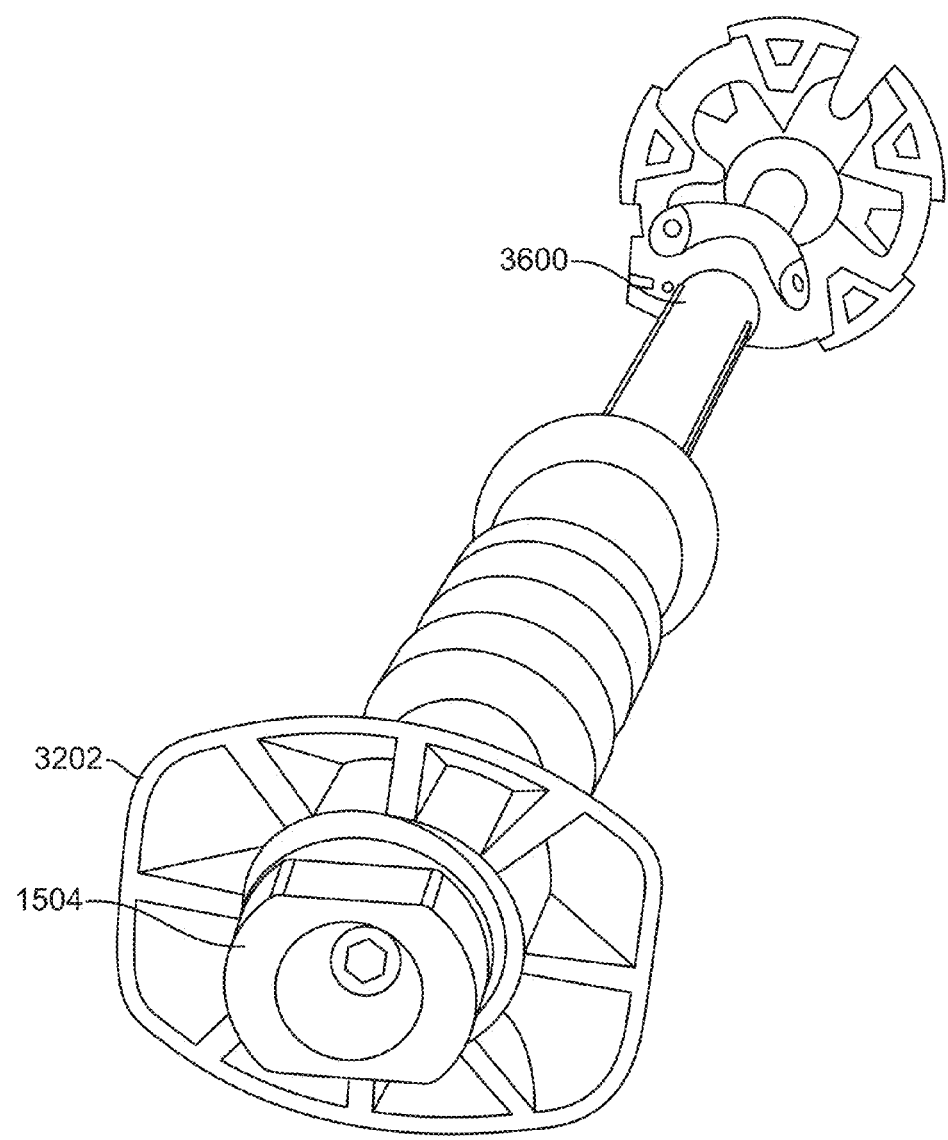

FIG. 36 shows a view of a pole device 3600 that can be used in conjunction with a hand-held device 100 consistent with implementations of the current subject matter. In this example the pole device 3600 can be a trekking pole, a ski pole, or other type of pole device that a user might employ while performing one or more activities. At an opposite end of the pole device 3600 to an end configured for contacting the ground, a mating post connector 3202 can be included to allow joining of this end of the pole device with one or more of the components discussed elsewhere here again. FIG. 37 and FIG. 38 show views of the opposite end of a pole device as discussed.

Figure 39A:
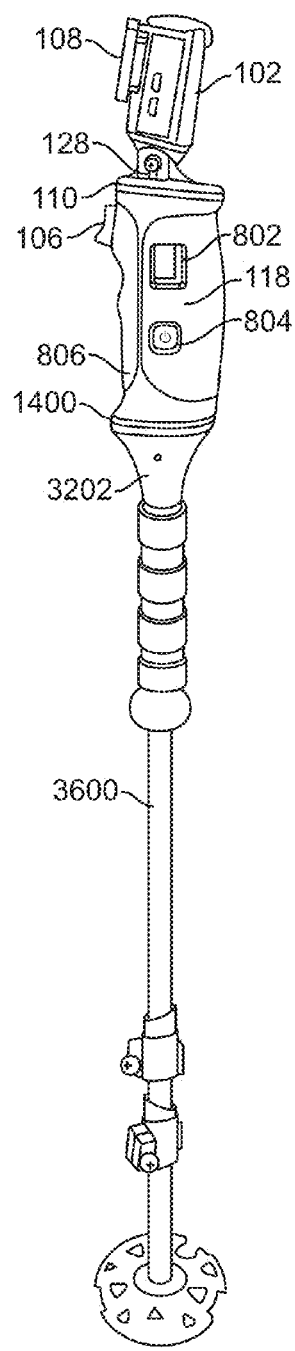
Figure 39B:
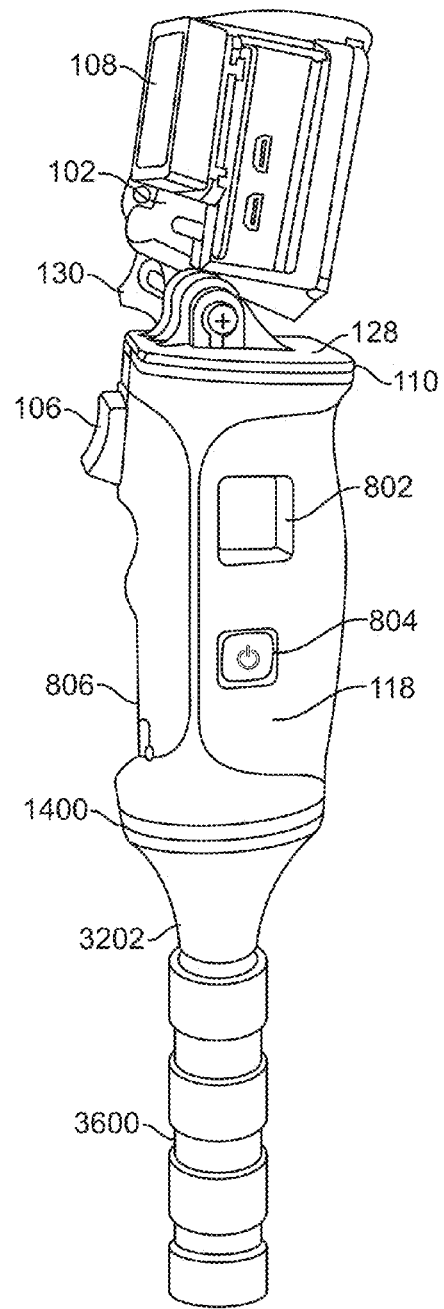

FIG. 39A and FIG. 39B show two views of a pole device 3600 consistent with the descriptions above in which the pole device 3600 is joined to a hand-held device 100 and the hand-held device 100 at its opposite end is joined to an intermediate mounting structure 128 supporting a camera 102. In another possible mode of operation, the camera 102 can be joined directly to the top of the pole device 3600 while the hand-held device 100 is deployed elsewhere. For example, a user could choose to mount a camera 102 at the top of the pole device 3600, and place the pole device 3600 in a position to support the camera 102 to capture images or video of the user. The user could then use the hand-held device to activate the remote control device 104 to cause the camera 102 to operate as desired.

Figure 40:
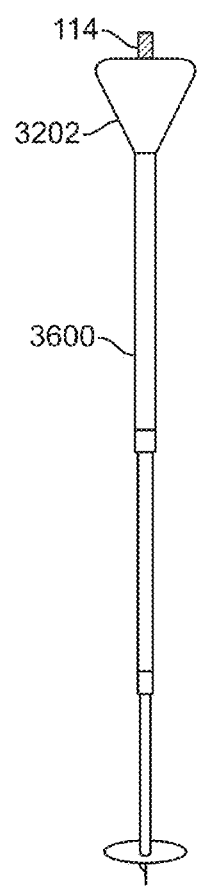
Figure 41:
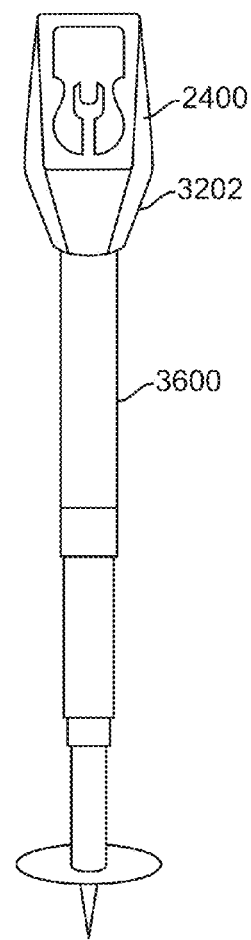

As discussed above other connectors besides the mating post 1504 and socket structure 1402 are also within the scope of the current subject matter. FIG. 40 shows a diagram illustrating a connector 3202 with a threaded screw 114 at the top of a pole device 3600 as discussed, and FIG. 41 shows an example of a male and female clip connector arrangement that can be used with a pole device.

Figure 42:
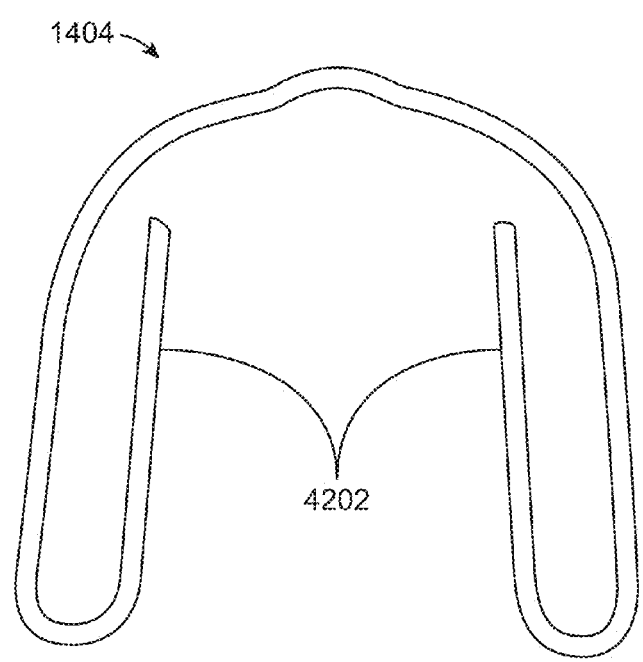
FIG. 42 through FIG. 44 show various views illustrating features of a retaining piece for use in a socket and post mounting configuration consistent with implementations of the current subject matter.

FIG. 42 shows a close-up of a retaining piece 1404 consistent with implementations of the current subject matter. The retaining piece 1404 can be formed of metal, or metal wire, or the like. Alternatively, other materials capable of resilient deformation can be used in forming the retaining piece 1404. As discussed above, the retaining piece 1404 can sit within a socket structure 1402 of a first apparatus, such as those discussed above. A mating post 1504 on a second apparatus can have opposite sides that are relatively smooth such that they can slide past the at least approximately straight inner locking portions 4202 of the retaining piece 1404. When the mating post 1504 is rotated by some angle (e.g. 90°) after insertion into the socket structure 1402 (e.g. from an insertion orientation to a locked orientation), the inner locking portions 4202 of the retaining piece 1404 can come into collaborative contact (e.g. can fixably engage) with slots 1506 on other sides of the mating post 1504 such that the mating post 1504 cannot be removed from the socket structure 1402 without rotating the mating post back to the insertion orientation. The inner locking portions 4202 can be positioned such that they sit in a plane that is at least approximately orthogonal to an axis of the socket structure 1402 (e.g. an axis to which the movement of the mating post 1504 into and out of the socket structure is at least approximately parallel).

Figure 43:
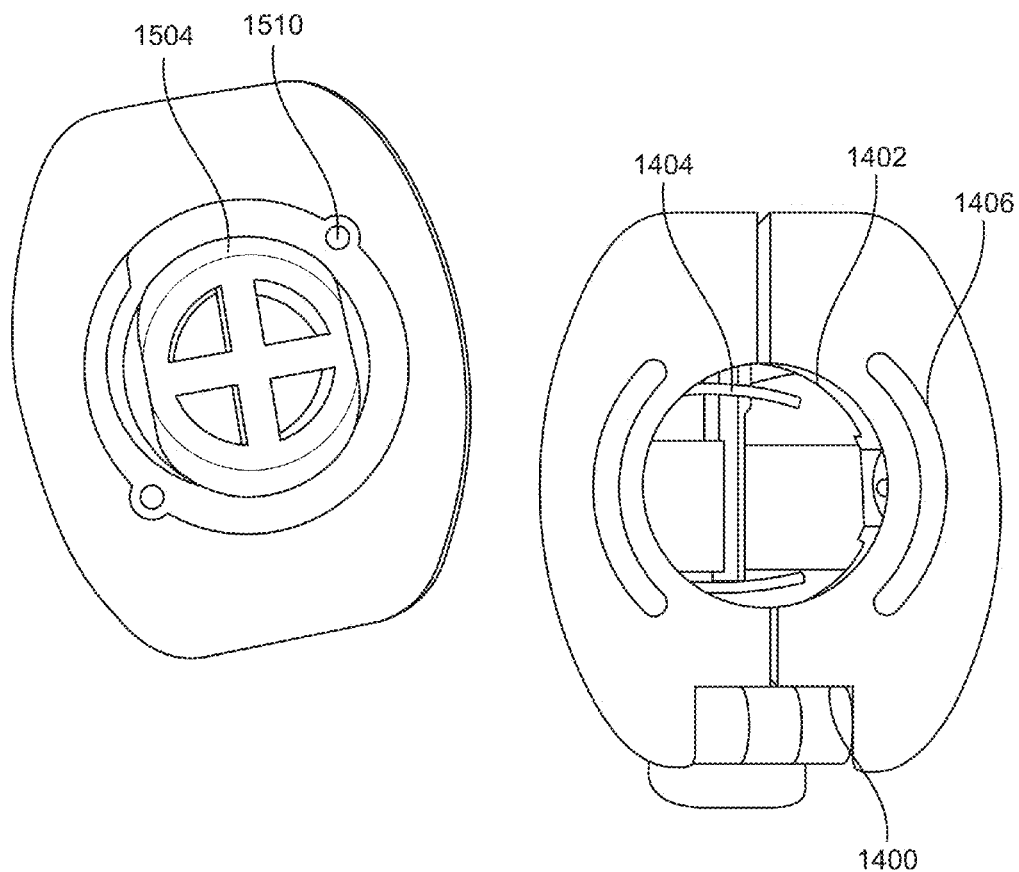
Figure 44:
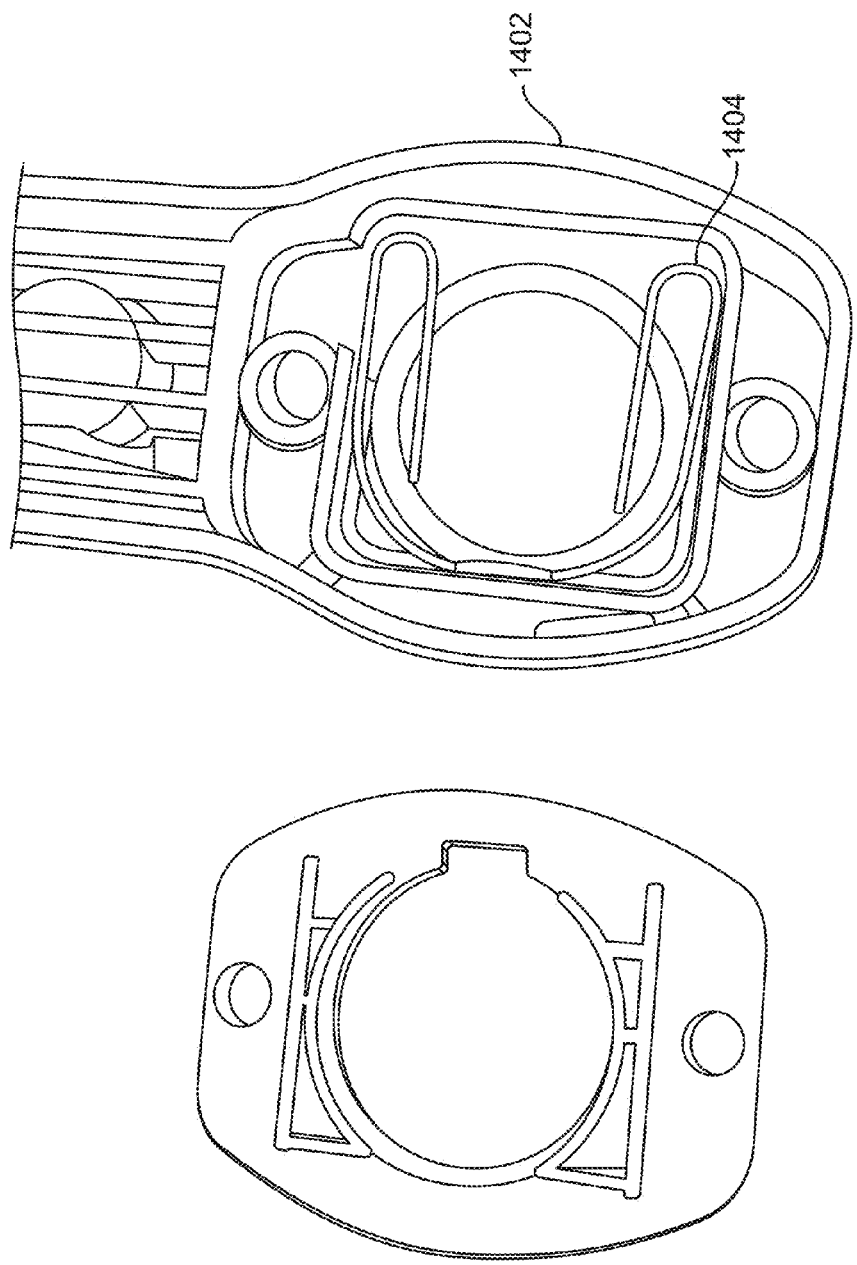

FIG. 43 shows a close-up view of a mating post 1504 and socket structure 1402. FIG. 44 shows a cut-away view illustrating positioning of the retaining piece 1404 within a socket structure 1402.

Figure 45A:
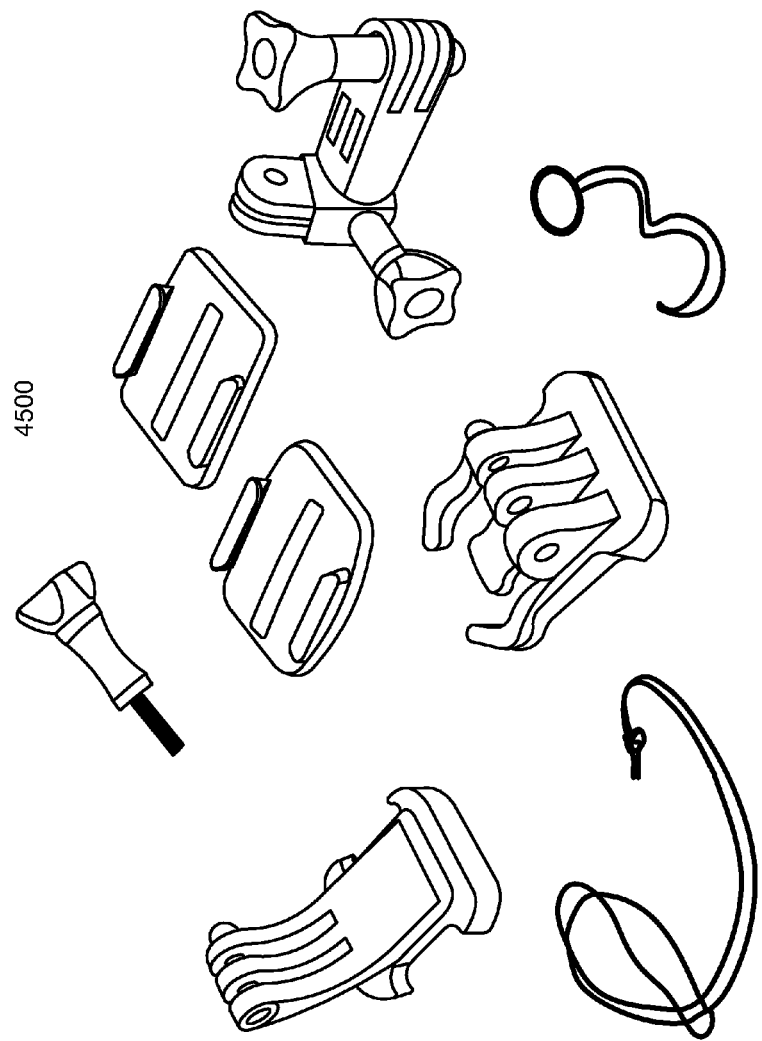
FIG. 45A and FIG. 45B show various views of additional connectors that can be used in implementations of the current subject matter.
Figure 45B:
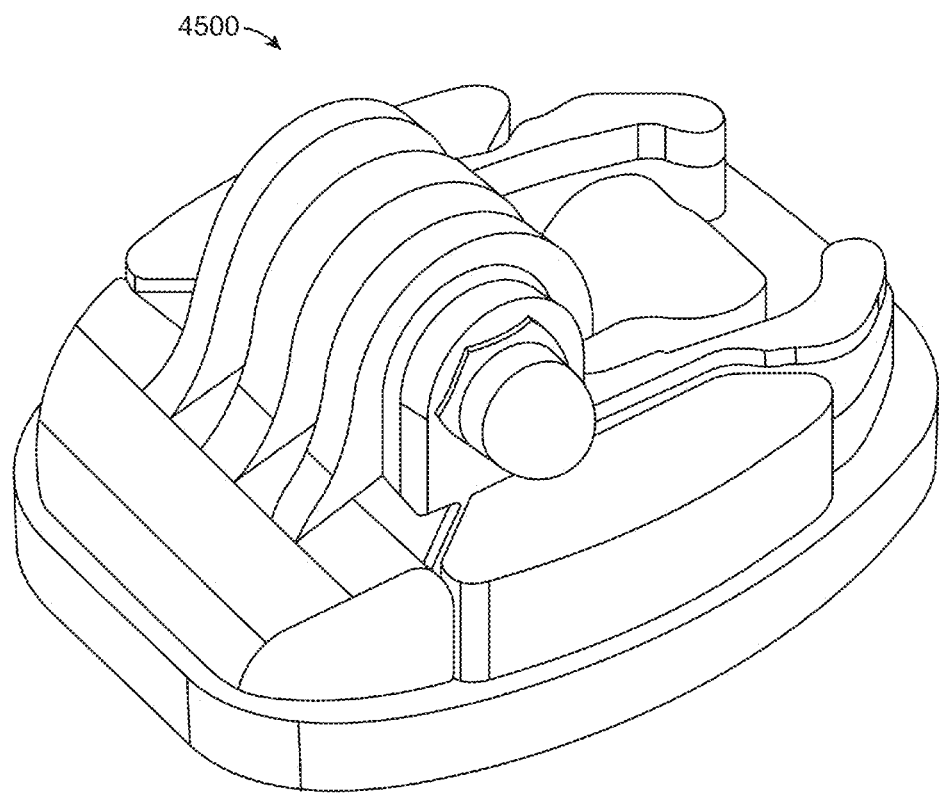

It should be noted that other types of connectors 4500, both proprietary and generic, can be used in association with the components of a camera mounting and actuation system 100 as described herein. FIG. 45A and FIG. 45B show examples of such connectors.

Figure 46A:
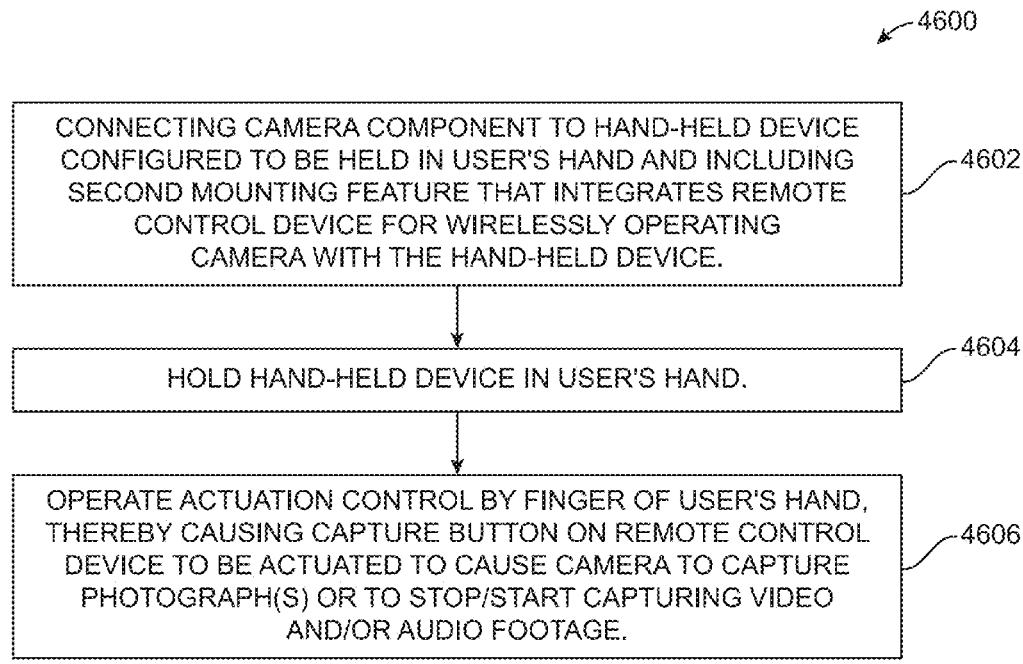
FIG. 46A and FIG. 46B show process flow charts illustrating features of methods consistent with implementations of the current subject matter.

FIG. 46A shows a process flow chart 4600 illustrating features of a method consistent with implementations of the current subject matter. It will be understood that all features shown and discussed in reference to FIG. 46A may not be required in every implementation. At 4602, at least one camera component is connected to a hand-held device configured to be held in a user's hand. The hand-held device further includes a second mounting feature that integrates a remote control device for wirelessly operating a camera with the hand-held device. The hand-held device is held in the user's hand at 4604. Operating an actuation control by a finger of the user's hand at 4606 causes a capture button 140 on the remote control device to be actuated to cause the camera to capture one or more photographs or to stop or start capturing video and/or audio footage.

Figure 46B:
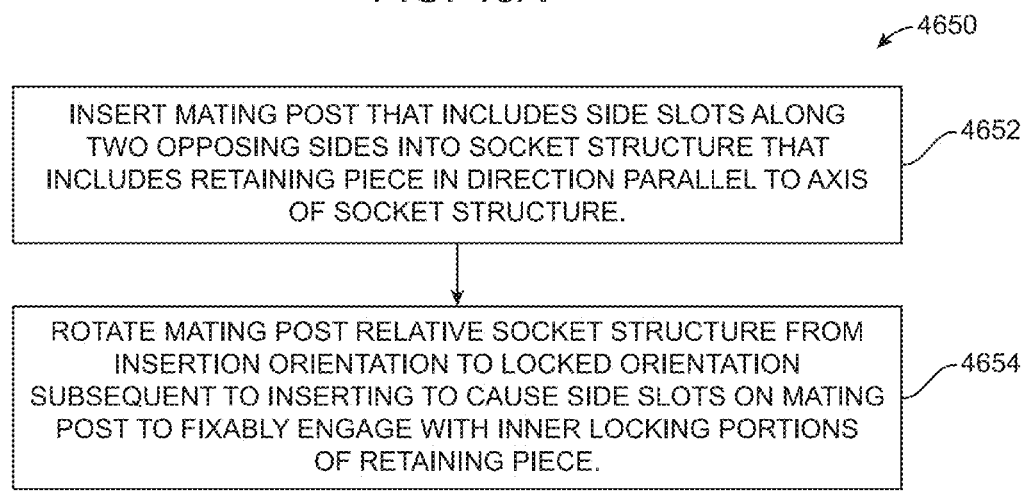

FIG. 46B shows a process flow chart 4650 illustrating features of a method consistent with implementations of the current subject matter. It will be understood that all features shown and discussed in reference to FIG. 46B may not be required in every implementation. At 4652, a mating post on a second apparatus (which can be an intermediate mounting structure 128) is inserted into a socket structure on a first apparatus (e.g. a hand-held device 100) in a direction parallel to an axis of the socket structure. The mating post includes side slots along two opposing sides of the mating post, and the socket structure includes a retaining piece. The retaining piece includes opposing inner locking portions that are disposed approximately orthogonally to the axis of the socket structure. At 4654, the second apparatus is rotated relative to the first apparatus from an insertion orientation to a locked orientation subsequent to the inserting. The rotating causes the side slots on the mating post to fixably engage with the inner locking portions of the retaining piece.

In other implementations of the current subject matter, mechanisms can be used for securing and positioning a camera to the top of a sports board.

Since the inception of photography, recorders of human experience have sought ever-more-desirable imagery using interesting P.O.V (point of view) photography/videography. The participant is often times unable to achieve desired results due to limitations in camera mounting options and the absence of a free hand to operate the camera. Photography/videography within board riding sports such as surfing is often very limited due to the physically demanding nature of such sports. Furthermore the participant is most often trying to capture their activity and usage of the sports board at its highest possible level without the hindrance of photography based multitasking while mid action.

Along with the physical inconvenience posed in such situations, there is also a level of danger associated with such multitasking that inherently increases the level of danger to the participant. Also, the participant is often unable to stow the camera once a desired image has been taken. More often than not, this athlete/surfer would preferred to be able to capture such images without the need to physically touch the camera or stow the camera while riding. Yet another problem faced during POV-based photography within board sports such as surfing, is the inability to raise the camera viewing level to a desired height and angle off the mounting surface of the sports board. Without such abilities, the participant is very limited in the imagery options available to him/her. For the purposes of this document, and for ease of description, such sporting boards may be referred instance of a "surfboard" and the activity of "surfing."

Given the challenges faced within the realm of board sports-based P.O.V (point of view) photography stated above, most participants choose not to attempt such photography themselves and rely on others to do so for them. However positioning a photographer/videographer in the situations encountered during these board sports activities is often dangerous to both parties and the "second person" perspective is very limiting to the image capturing capabilities. It is also impossible in many cases, to replicate the first person point of view when using a secondary photographer/videographer.

Consistent with descriptions herein, a camera mounting system can be incorporated within a "grip pad" which is very common and already found on many sports boards to date. Grip pads are typically placed on sports boards due to the fact that the direct surface of the existing sports board is not adequate for sufficient grip to the user. Due to the limited space on such sports boards, the current subject matter combines a camera mounting element within a version of one of these grip pads to allow the user to capture desired images while also functioning in the same way as a typical grip pad.

Some implementations of the current subject matter relate to mounting systems for securing a camera to the top of a sports board and methods for using such systems. In some implementations, the mounting mechanism is provided in the form of a grip pad, also referred to as a "stomp pad," for use to capture imagery during a sporting activity being performed by a rider of the sports board (hereinafter "board"), such as a surfboard, a wakeboard, a windsurfing board, a paddle board, a skateboard, or the like. The mounting systems can also include an adjustable or articulated boom or other positioning mechanism to raise and lower the camera viewing position, and/or to change the viewing angle per the user's preference.

Figure 47A:
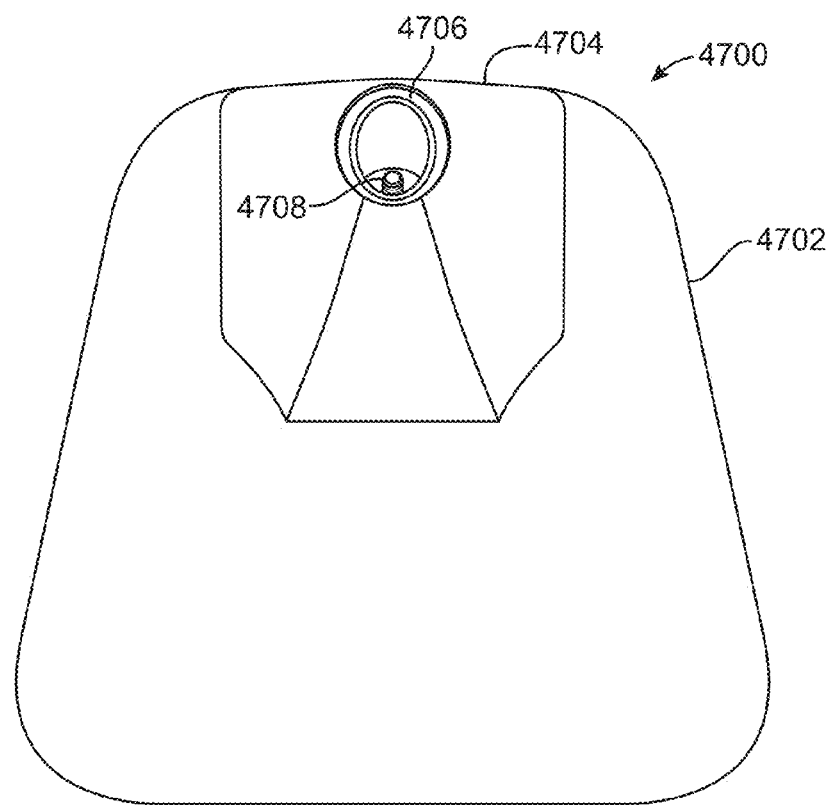
Figure 47B:
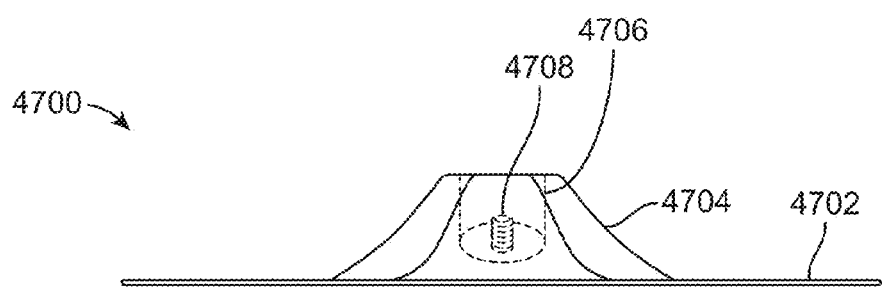

FIGS. 47A and 47B are a top-down view and a side view, respectively of an implementation of a board grip camera mount 4700, in accordance with some implementations. The board grip camera mount 4700 includes a grip pad 4702 configured to attach to a sports board (e.g. a surfboard, a skate board, a paddle board, or the like), and a pad mount 4704 that is integrated with (e.g. provided on, to or with) the grip pad 4702. The pad mount 4704 includes a mounting cavity 4706 that is sized and adapted to receive a camera boom (not shown) on which a camera can be mounted, positioned and aligned. The mounting cavity 4706 can also include one or more mounting mechanisms 4708 to or on which the camera boom can be connected and affixed for fixedly mounting the camera boom and camera to a top surface (e.g. a surface upon which a user stands, sits, or otherwise rides) of a sports board.

In some implementations, the grip pad 4702 can be any flexible or compressible material, or even a rigid material with a gripping contour or surface, such as polyurethane or other polymer or synthetic material. The grip pad 4702 can be made of rubber, foam, or plastic, or any other material that can be formed in a substantially planar surface. The surface area of the grip pad 4702 can be between several square inches, to one or more square feet. The grip pad 4702 and/or pad mount 4704 can include any number or type of surface features such as divots, channels, protrusions, or the like, and can also have any color or surface ornamentation.

The pad mount 4704 is preferably a raised or extended portion from the planar grip pad 4702. In some implementations, however, the pad mount 4704 and grip pad 4702 are contiguous or integrated, in a unitary fashion, such that the grip pad 4702 represents only the interface to the board, while the pad mount 4704 extends up from the grip pad 4702. The pad mount 4704 can be raised slightly from the grip pad, i.e. several millimeters, or can extend to a substantially greater height above the grip pad, i.e., several centimeters or inches. In some preferred implementations, the pad mount 4704 has a height above the grip pad 4702 in order to support a mounting cavity 4706 that is at least 47 inch in depth.

In some implementations, as shown in FIG. 47C, the mounting cavity 4706 can be oriented into the pad mount 4704 at an angle so that at least a portion of an interior wall of the mounting cavity is greater than 47 inch. This arrangement provides an increased or maximized surface area of the mounting cavity 4706 interior wall to support a larger area of outer surface of at least a proximal portion of the camera boom.

The mounting mechanism 4708 can include one or more of a screw, a bolt, a pin, a latch, a clip, a lock, a friction fit, threading on the interior wall of the mounting cavity 4706, orientation guides or indentations or ridges, grooves and corresponding teeth between the mounting cavity and the insertable portion of the camera boom, or the like, or any combination thereof. Still other types and numbers of mounting mechanisms 4708 can be used. The mounting mechanism 4708 receives and stabilizes the camera boom within the mounting cavity 4706, and preferably maintains the camera boom 158 at a particular angle, position and/or orientation. In some implementations, the mounting mechanism 4708 is dynamically configurable or adjustable, providing a user with a number of options of positioning, angle and/or orientation. When not in use, i.e., when not occupied by a portion of a camera boom, the mounting cavity 4706 can include a plug or seal (not shown).

FIG. 48A shows an exploded view, and FIG. 48B shows an assembled view, of a board grip camera mount 4700 that adheres to, mounts on, or is otherwise affixed to a board 4800. The board grip camera mount 4700 includes a pad mount for receiving a camera boom 158 to position and align a camera 102 at a desired position and orientation, for providing a desired point-of-view (POV) of the camera 102 to a rider of the board 4800. The POV is uniquely aft of the board 4800, and further behind the rider than a POV of a hand-held camera by the rider, or by other conventional mounting mechanisms. Further, the board grip camera mount 4700 supports and allows the use of boom 158 of a configurable length, so as to provide any number of positions and orientations for the camera 102.

In some implementations, the camera boom 158 is cylindrical, and therefore the mounting cavity 4706 is also cylindrical. However, the camera boom 158, or at least the portion of the camera boom 158 that is insertable into the mounting cavity 4706 of the pad mount of the board grip camera mount 4700, can have any cross section. In some implementations, the cross section is multi-sided, and where the mounting cavity also is multi-sided so as to accommodate the camera boom, whether or not in any particular orientation. For example, the insertable portion of the camera boom 158 can have a tear-drop cross section, the point of which corresponds to a point within the mounting cavity to receive the insertable portion of the camera boom 158 at a particular orientation.

In yet other implementations, the camera boom 158 can include a number of articulating joints, such as ball joints, hinges, or other types of joints, and can include any type of connector to the camera. In some implementations, the camera boom 158 and/or pad mount can include a break-away feature that disengages the camera boom 158 from the board grip camera mount 4700 if a threshold of pressure is applied to either the camera or the camera boom 158, i.e., if a board rider "wipes out" and knocks against the camera or camera boom 158.

FIG. 49A and FIG. 49B illustrate one implementation of a board grip camera mount assembly 4900, having an adhesive layer 4902 for adhering a pad mount 4904 to a board, and to a grip pad 4906. The pad mount 4904 includes a mounting cavity 4905, and can be formed of a rigid or partially rigid material, such as metal, plastic, nylon, carbon fiber, high-density rubber, or the like. The grip pad 4906 fits over the pad mount 4904 and includes a pad mount cavity 4907 that receives and at least partially covers the pad mount 4904.

Figure 50:
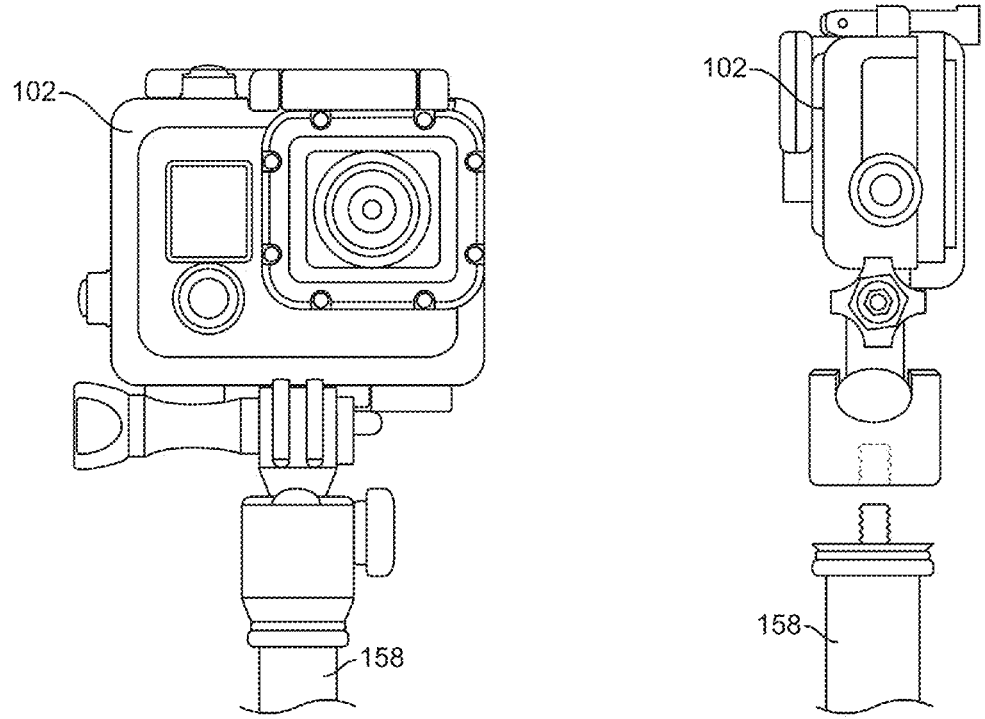
FIG. 50 shows a mounting mechanism for mounting a camera on a camera boom, in accordance with implementations described herein.
Figure 51:
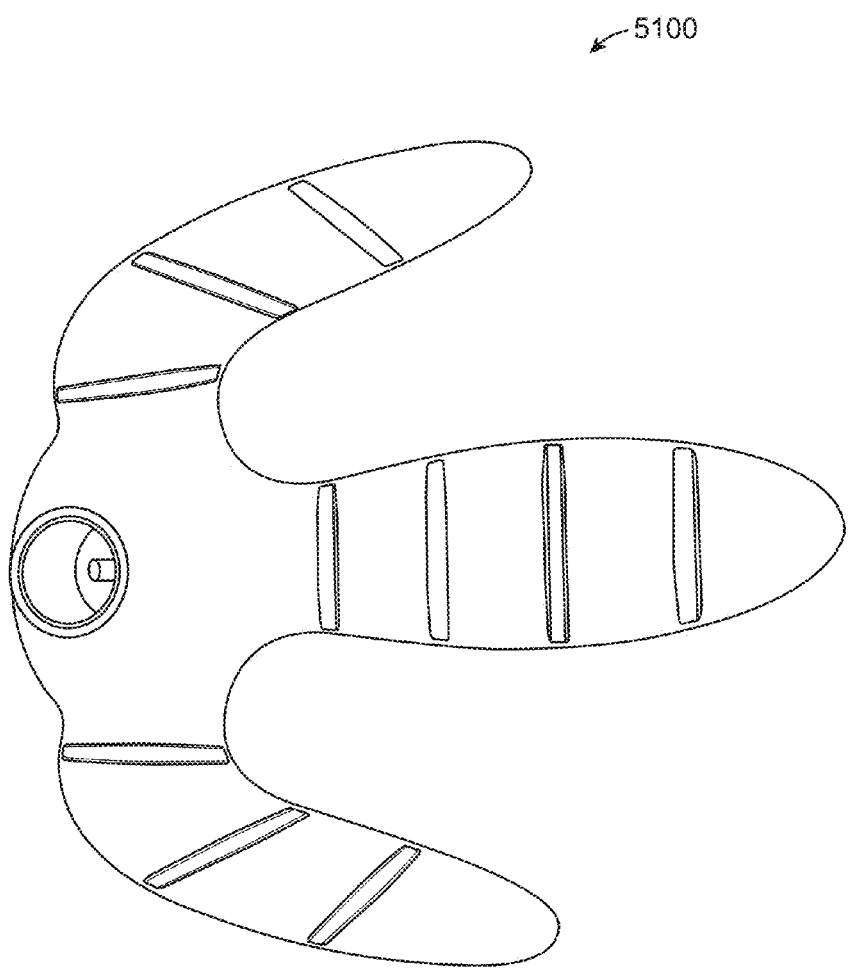
FIG. 51 shows a view of an alternative shape of a board grip camera mount.
Figure 52:
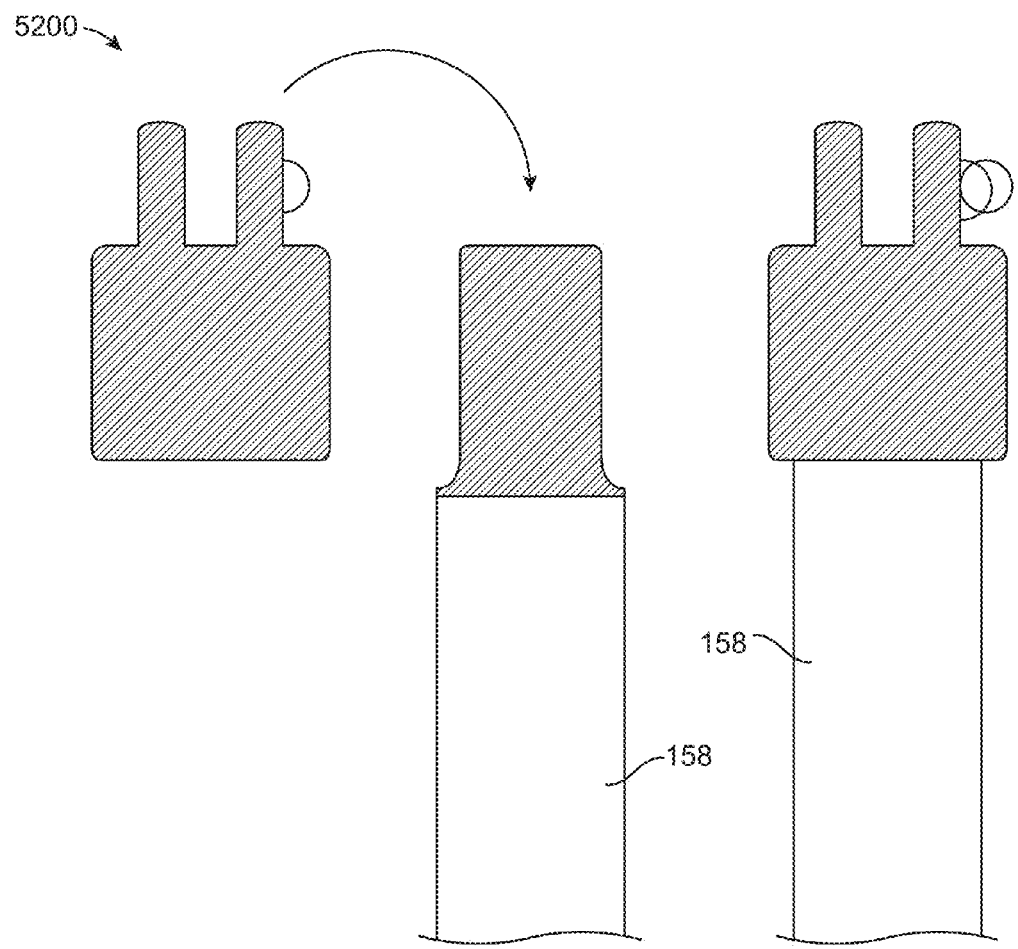
FIG. 52 shows another mounting mechanism for mounting a camera on a camera boom.

FIG. 50 illustrates a mounting mechanism for mounting a camera 102 on a camera boom 158, in accordance with implementations described herein. It will be readily understood that any of the connecting structures discussed elsewhere in this disclosure can be used for connecting a camera 102 to a camera boom 158. Additionally a remote control device 104 that wirelessly operates the camera 102 can be integrated into a hand-held device 100 consistent with the current subject matter. Such an approach can be useful even when the camera is not directly attached to the hand-held device 100 in that the various connection options of the hand-held device can allow for attachment of a leash or tie via which a user can more securely retain possession of the remote control device 104 even in the event of a fall, a crash, etc. FIG. 51 illustrates an alternative shape 5100 of a board grip camera mount. FIG. 52 shows another mounting mechanism 5200 for mounting a camera on a camera boom 158.

Figure 53B:
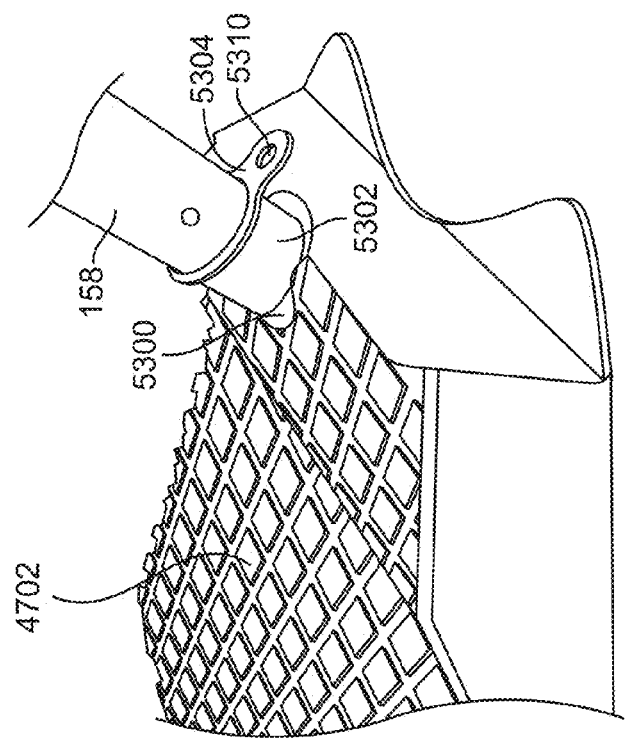
FIG. 53A and FIG. 53B show views of a breakaway connector configured for use with a board mount consistent with implementations of the current subject matter.
Figure 53A:
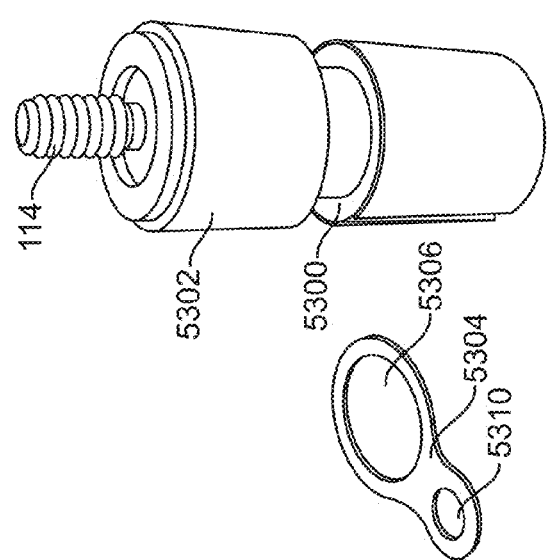

FIG. 53A and FIG. 53B illustrates features of a connector piece usable in conjunction with board mounted implementations of the current subject matter. A user using a camera mounted in a manner consistent with the previous discussions of board mounts may perform one or more high speed or potentially dangerous activities while the camera is mounted in this manner. Such activities can pose a risk that a loss of control of the board by the user might result in a body part of the user colliding with the camera boom 158. If the camera boom is rigidly and securely attached to a grip pad 4702 or other mounting feature, such a collision, or any other actions that causes one or more an impact, compressive, or expansive force could result in injury to the user and/or damage to the camera boom 158, the sports board, the grip pad or pad mount, or even the camera.

Accordingly, it can be desirable for the camera boom to include a preferred breakaway point 5300 that is structurally weaker than a remainder of the camera boom and of the spacer part such that the camera boom 158 would break off from rigid attachment to the grip pad 4702 or other mounting feature at the preferred breakaway point 5300 if a stressing force exceeds a threshold for the preferred breakaway point 5300. The preferred breakaway point 5300 can advantageously be included in a spacer part 5302, which can be connectable between a rigid camera boom 158 and the grip pad 4702 or other mounting feature. FIG. 53A shows an example of a spacer part 5302 consistent with implementations of the current subject matter and including a preferred breakaway point 5300. In this example, the preferred breakaway point 5300 includes a tapered section whose cross-sectional area (and therefore bending resistance) is less than a remainder of the spacer part 5302 and of the camera boom 158. The spacer part 5302 can include connectors at both ends, which can optionally be any kind of connector similar to those described herein as well as other functional equivalents. In the example of FIG. 53A and FIG. 53B, the spacer part can include a threaded socket on one end (not shown) and a threaded post 114 on the other such that one end of the spacer part screws onto a threaded post or into a threaded socket on or in the grip pad 4702 or other mounting feature and the other end of the spacer part screws into a threaded socket or onto a threaded post in or on the camera boom 158.

Also shown in FIG. 53A and FIG. 53B is an example of a leash or tie retainer 5304 that can be used conjunction with the spacer part 5302 having the preferred breakaway point 5300. In use, a first ring 5306 of the leash or tie retainer 5304 can be positioned concentrically with an axis running through the spacer part 5302 and the camera boom 158 and between the spacer part 5302 and the camera boom 158 such that when the spacer part 5302 and the camera boom 158 are connected to one another, the leash or tie retainer 5304 is secured between them. A second ring or loop 5310 of the leash or tie retainer 5304 can receive and be secured to a first end of leash, a tie, or some other flexible connector, which can at a second end be secured to the board, a body part of the user, the grip pad 4702 or other mounting feature, etc. such that if the spacer part 5302 breaks at the preferred breakaway point 5300, the camera boom 158 and a camera attached to its other remain in flexible connection to either the board or to the user and is therefore less likely to become lost or damaged.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:
1. An apparatus comprising:
a hand-held device configured to be held in a hand;

a first mounting feature for connecting at least one camera component to the hand-held device, the first mounting feature including:
  a socket structure comprising a retaining piece, the retaining piece comprising opposing inner locking portions that are disposed orthogonally to an axis of the socket structure, and
  one or more grooves into which the socket structure is set;
a second mounting feature for integrating a remote control device for wirelessly operating a camera with the hand-held device;
an actuation control structured to actuate a capture button on the remote control device in response to being selected so that the camera captures one or more photographs or stops or starts capturing video and/or audio footage; and
a mating post on the at least one camera component, the mating post comprising:
  side slots along two opposing sides of the mating post, the side slots on the mating post fixable engaging with the inner locking portions of the retaining piece when the mating post is inserted into the socket structure at least in parallel to the axis of the socket structure and the at least one camera component is subsequently rotated from an insertion orientation to a locked orientation, and
  one or more guide pins that come into contact with the first mounting feature when the hand-held device and the at least one camera component are connected, the one or more guide pins slide within the one or more grooves as the at least one camera component is rotated from the insertion orientation to the locked orientation,
  wherein the one or more guide pins and the one or more grooves cooperating to restrain an angle of rotation of the at least one camera component relative to the hand-held device to a locking angle.

2. An apparatus as in claim 1, wherein the first mounting feature further comprises a locking bar configured to restrict rotation of the at least one camera component from the locked orientation to the insertion orientation unless the locking bar is manipulated to disengage a locking feature on the locking bar from a locking receiving feature on the hand-held device.

3. An apparatus as in claim 1, wherein the first mounting feature allows two opposite orientations of the at least one camera component relative to the hand-held device.

4. An apparatus as in claim 1, wherein the at least one camera component comprises the camera.

5. An apparatus as claim 1, wherein the at least one camera component comprises at least one of a camera boom, a side grip, a suitcase grip, and a pole device.

6. An apparatus as in claim 1, wherein the second mounting feature for integrating the remote control device comprises a remote control compartment accessible by a hinged door on a side of the hand-held device, the remote control compartment being sized and shaped to accept the remote control device.

7. An apparatus as in claim 1, wherein the second mounting feature for integrating the remote control device comprises a retaining clip disposed at an end of the hand-held device and that secures the remote control device with a front face of the remote control device facing toward a body of the hand-held device.

8. An apparatus as in claim 1, wherein the second mounting feature for integrating the remote control device comprises computer circuitry that implements the remote control device functionality as part of the hand-held device.

9. An apparatus as in claim 1, wherein the actuation control comprises a trigger button configured to be pressed by an index finger of the hand in which the hand-held device is configured to be held.

10. An apparatus as in claim 9, wherein the actuation control further comprises a mechanical arm that is deflected or moved upon the trigger button being depressed, the mechanical arm pressing the capture button on the remote control device.

11. An apparatus as in claim 1, wherein the camera comprises an action camera.

12. A method of operating a handheld device, the method comprising:
  connecting a mating post of at least one camera component to a first mounting feature of a hand-held device, the hand-held device further comprising a second mounting feature that integrates a remote control device for wirelessly operating a camera,
    the first mounting feature comprising:
      a socket structure comprising a retaining piece, the retaining piece comprising opposing inner locking portions that are disposed orthogonally to an axis of the socket structure, and
      one or more grooves into which the socket structure is set; and
    the mating post comprising:
      side slots along two opposing sides of the mating post, the side slots on the mating post fixably engaging with the inner locking portions of the retaining piece when the mating post is inserted into the socket structure at least in parallel to the axis of the socket structure and the at least one camera component is subsequently rotated from an insertion orientation to a locked orientation, and
      one or more guide pins that come into contact with the first mounting feature when the hand-held device and the at least one camera component are connected, the one or more guide pins slide within the one or more grooves as the at least one camera component is rotated from the insertion orientation to a locked orientation, the one or more guide pins and the one or more grooves cooperating to restrain an angle of rotation of the at least one camera component relative to the hand-held device to a locking angle;
  holding the hand-held device; and
  operating an actuation control, the operating causing a capture button on the remote control device to be actuated to cause the camera to capture one or more photographs or to stop or start capturing video and/or audio footage.

13. A method as in claim 12, wherein the at least one camera component comprises the camera.

14. A connector system comprising:
  a first apparatus to be joined to a second apparatus, the first apparatus comprising:
    a socket structure comprising a retaining piece, the retaining piece comprising opposing inner locking portions that are disposed orthogonally to an axis of the socket structure; and
    one or more grooves on a first surface into which the socket structure is set; and
  the second apparatus comprising:
    a mating post comprising side slots along two opposing sides of the mating post, the side slots on the mating post fixably engaging with the inner locking portions of the retaining piece when the mating post is inserted into the socket structure at least in parallel to the axis of the socket structure and the second apparatus is subsequently rotated from an insertion orientation to a locked orientation; and one or more guide pins on a second surface that comes into contact with the first surface when the first apparatus and second apparatus are connected using the connector system, and the one or more guide pins slide within the one or more grooves as the second apparatus is rotated from the insertion orientation to a locked orientation, the one or more guide pins and the one or more grooves cooperating to restrain an angle of rotation of the second apparatus relative to the first apparatus to a locking angle.

15. A connector system as in claim 14, wherein rotation of the second apparatus from the locked orientation to the insertion orientation disengages the inner locking portions of the retaining pieces from the side slots such that the mating post can be removed from the socket structure.

* * * * *